(12) United States Patent
Smith et al.

(10) Patent No.: US 11,988,271 B2
(45) Date of Patent: May 21, 2024

(54) AXLE ASSEMBLY HAVING AN ELECTRIC MOTOR MODULE AND METHOD OF MANUFACTURE

(71) Applicant: ArvinMeritor Technology, LLC, Troy, MI (US)

(72) Inventors: Mark Smith, Troy, MI (US); Dhanapal Vittala Raya, Troy, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 863 days.

(21) Appl. No.: 17/053,391

(22) PCT Filed: May 9, 2019

(86) PCT No.: PCT/US2019/031469
§ 371 (c)(1),
(2) Date: Nov. 6, 2020

(87) PCT Pub. No.: WO2019/217647
PCT Pub. Date: Nov. 14, 2019

(65) Prior Publication Data
US 2021/0376686 A1    Dec. 2, 2021

Related U.S. Application Data

(60) Provisional application No. 62/669,462, filed on May 10, 2018.

(51) Int. Cl.
*F16H 57/037*    (2012.01)
*B60K 1/00*    (2006.01)
(Continued)

(52) U.S. Cl.
CPC ............. *F16H 57/033* (2013.01); *B60K 1/00* (2013.01); *B60R 16/0239* (2013.01);
(Continued)

(58) Field of Classification Search
CPC ...... F16H 57/033; F16H 48/42; F16H 57/021; F16H 57/037; F16H 57/032;
(Continued)

(56) References Cited

U.S. PATENT DOCUMENTS 1,946,051 A * 2/1934 Alden ..................... F16H 48/08
475/230
2,561,335 A * 7/1951 Buckendale ............ F16H 48/08
475/230

(Continued)

FOREIGN PATENT DOCUMENTS

CN    103459866 A    12/2013
CN    205070668 U    3/2016
(Continued)

OTHER PUBLICATIONS

European Examination Report dated Oct. 20, 2023, for related European Appln. No. 19725823.9 6 Pages.
(Continued)

*Primary Examiner* — Justin Holmes
(74) *Attorney, Agent, or Firm* — Brooks Kushman PC

(57) ABSTRACT

An axle assembly and a method of manufacture. The axle assembly may include a differential carrier and a bearing support wall. The differential carrier may be made of a first material. The bearing support wall may be mounted to the differential carrier and may be made of a second material. The second material may have a greater stiffness than the first material.

19 Claims, 23 Drawing Sheets

(51) Int. Cl.
  *B60R 16/023* (2006.01)
  *F16H 48/42* (2012.01)
  *F16H 57/021* (2012.01)
  *F16H 57/033* (2012.01)
  *H02G 3/22* (2006.01)
  *H02K 5/173* (2006.01)
  *H02K 5/22* (2006.01)
  *H02K 7/00* (2006.01)
  *H02K 7/08* (2006.01)
  *H02K 7/116* (2006.01)
  *B60K 11/02* (2006.01)
  *B60K 17/16* (2006.01)
  *F16H 57/02* (2012.01)
  *F16H 57/032* (2012.01)
  *F16H 57/04* (2010.01)

(52) U.S. Cl.
  CPC ........... *F16H 48/42* (2013.01); *F16H 57/021* (2013.01); *F16H 57/037* (2013.01); *H02G 3/22* (2013.01); *H02K 5/1737* (2013.01); *H02K 5/225* (2013.01); *H02K 7/006* (2013.01); *H02K 7/088* (2013.01); *H02K 7/116* (2013.01); *B60K 2001/001* (2013.01); *B60K 2001/006* (2013.01); *B60K 11/02* (2013.01); *B60K 17/165* (2013.01); *B60Y 2400/73* (2013.01); *F16H 2057/02034* (2013.01); *F16H 2057/02052* (2013.01); *F16H 57/032* (2013.01); *F16H 2057/0335* (2013.01); *F16H 57/0483* (2013.01)

(58) Field of Classification Search
  CPC ....... F16H 57/0483; F16H 2057/02034; F16H 2057/02052; F16H 2057/0335; B60K 1/00; B60K 11/02; B60K 17/165; B60K 2001/001; B60K 2001/006; B60R 16/0239; H02G 3/22; H02K 5/1737; H02K 5/225; H02K 7/006; H02K 7/088; H02K 7/116; B60Y 2400/73; B60Y 2200/14; B60Y 2200/41; B60Y 2410/115
  See application file for complete search history.

(56) References Cited

U.S. PATENT DOCUMENTS

| | | | |
|---|---|---|---|
| 3,605,965 A * | 9/1971 | Thomas | F16D 25/0638 475/86 |
| 4,004,472 A | 1/1977 | Millward et al. | |
| 4,754,847 A | 7/1988 | Glaze et al. | |
| 5,960,671 A | 10/1999 | Nguyen | |
| 8,858,379 B2 | 10/2014 | Kenney et al. | |
| 2003/0203783 A1 | 10/2003 | Sullivan | |
| 2006/0160651 A1 | 7/2006 | Petruska et al. | |
| 2008/0227581 A1 | 9/2008 | Catalano et al. | |
| 2009/0029821 A1 | 1/2009 | Martin, III et al. | |
| 2012/0021863 A1 | 1/2012 | Hirao et al. | |
| 2015/0087461 A1 | 3/2015 | Jackson et al. | |
| 2015/0362059 A1 | 12/2015 | Fukuda et al. | |
| 2017/0082186 A1 | 3/2017 | Elzib et al. | |
| 2017/0350498 A1 | 12/2017 | Muto et al. | |
| 2019/0054816 A1 | 2/2019 | Garcia et al. | |
| 2019/0054817 A1 | 2/2019 | Garcia et al. | |
| 2019/0054818 A1 | 2/2019 | Garcia et al. | |
| 2020/0173494 A1 | 6/2020 | Smith et al. | |
| 2020/0173531 A1 | 6/2020 | Smith | |
| 2020/0173535 A1 | 6/2020 | Peng et al. | |
| 2020/0173537 A1 | 6/2020 | Begov et al. | |
| 2020/0173541 A1 | 6/2020 | Soffner et al. | |
| 2020/0177049 A1 | 6/2020 | Raya et al. | |
| 2020/0177059 A1 | 6/2020 | Smith et al. | |

FOREIGN PATENT DOCUMENTS

| | | |
|---|---|---|
| CN | 106541782 A | 3/2017 |
| DE | 102008029287 A1 | 12/2009 |
| DE | 102011007257 A1 | 10/2012 |
| DE | 102011007268 A1 | 10/2012 |
| DE | 102011076527 A1 | 11/2012 |
| DE | 102011082017 A1 | 3/2013 |
| DE | 102016209997 A1 | 12/2017 |
| EP | 1382494 A1 | 1/2004 |
| EP | 1683990 A1 | 7/2006 |
| EP | 2712066 A2 | 3/2014 |
| WO | 2013/165026 A1 | 11/2013 |

OTHER PUBLICATIONS

International Preliminary Report on Patentability dated Nov. 19, 2020 for related PCT Application No. PCT/US2019/031469; 11 Pages.

China 1st Office Action dated May 31, 2023 for related China Appln. No. 201980031358.1; 8 Pages.

European Examination Report dated Apr. 11, 2022 for related EP Application No. 19725823.9; 7 pages.

Second Chinese Office Action dated Nov. 10, 2023 for related Chinese Appln. No. 201980031358.1; 8 Pages.

* cited by examiner

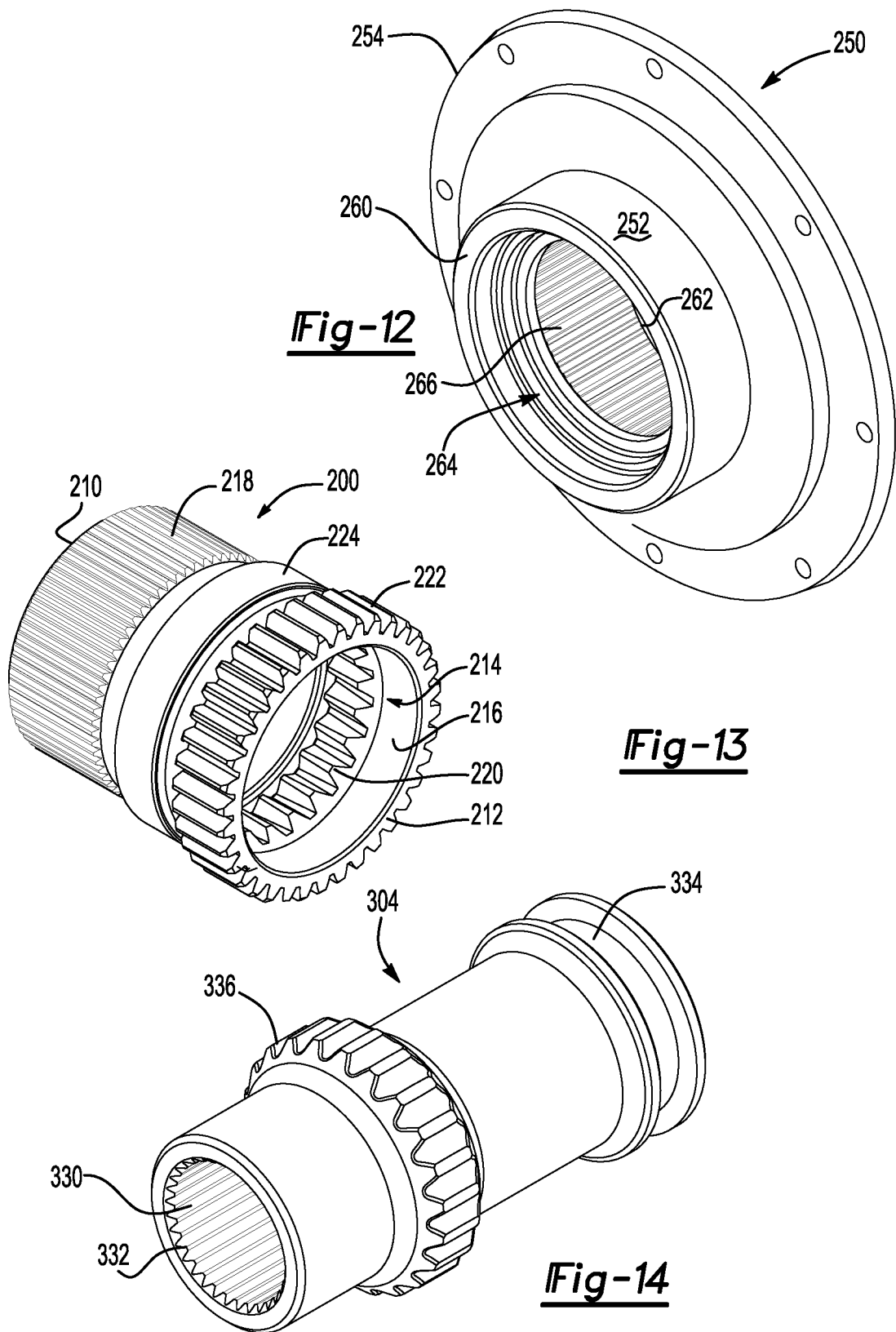

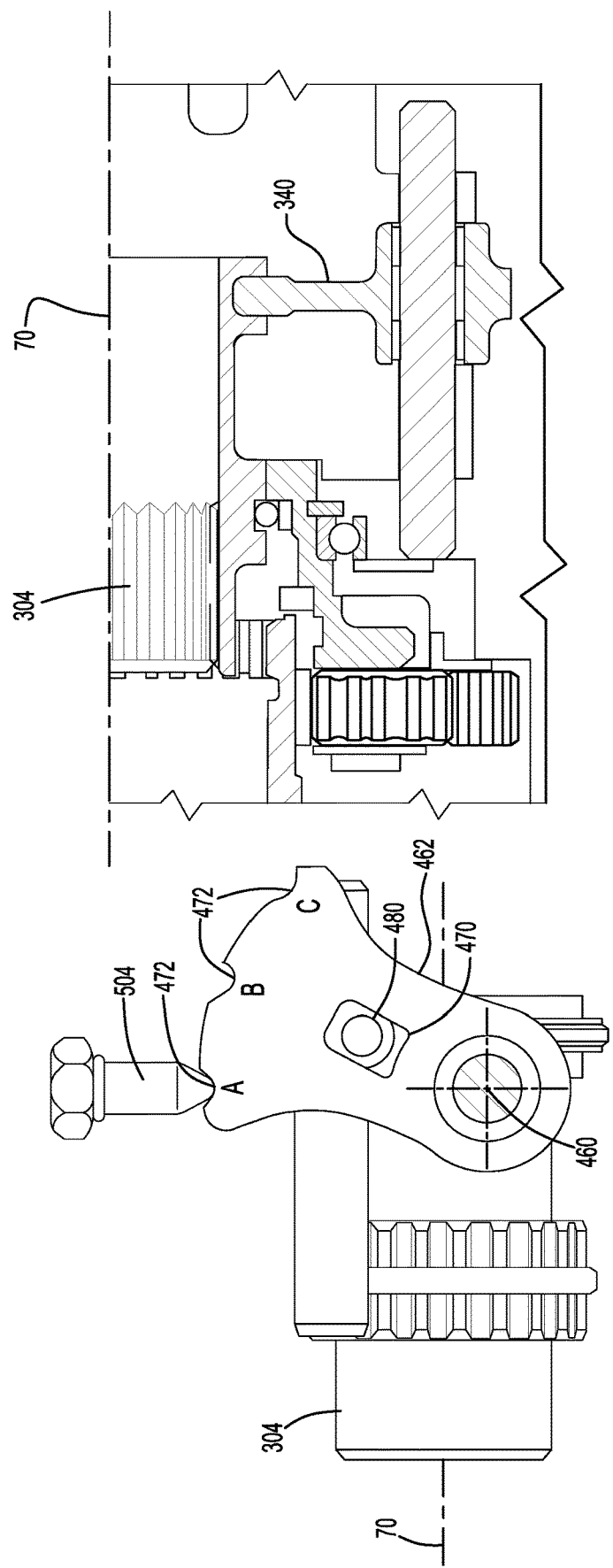

AXLE ASSEMBLY HAVING AN ELECTRIC MOTOR MODULE AND METHOD OF MANUFACTURE

CROSS-REFERENCE TO RELATED APPLICATIONS

This application is the U.S. national phase of PCT Application No. PCT/US2019/031469 filed on May 9, 2019, which claims the benefit of U.S. provisional application Ser. No. 62/669,462, filed May 10, 2018, the disclosures of which are hereby incorporated in their entirety by reference herein.

TECHNICAL FIELD

This disclosure relates to an axle assembly and a method of manufacture. The axle assembly may include an electric motor module that is rotatably supported on a bearing support wall that may be provided with a differential carrier. The bearing support wall may be made of a stiffer material than the differential carrier.

BACKGROUND

An axle assembly having an electric motor module is disclosed in U.S. Pat. No. 8,858,379.

SUMMARY

In at least one embodiment, an axle assembly is provided. The axle assembly may include an axle housing, a differential carrier, and a bearing support wall. The differential carrier may be mounted to the axle housing and may be made of a first material. The bearing support wall may be mounted to the differential carrier and may be made of a second material that has a greater stiffness than the first material. The bearing support wall may receive and may rotatably support a drive pinion. The bearing support wall may also rotatably support a rotor of an electric motor module.

In at least one embodiment, a method of making first and second axle assemblies is provided. The method may include providing first and second differential carriers that have the same configuration, a first differential assembly having a first ring gear, a second differential assembly having a second ring gear, and first and second bearing support walls. The first ring gear may have a different configuration than the second ring gear. The first bearing support wall may have a different configuration than the second bearing support wall. The first differential assembly and the first bearing support wall may be attached to the first differential carrier to provide the first axle assembly. The second differential assembly and the second bearing support wall may be attached to the differential carrier to provide the second axle assembly.

BRIEF DESCRIPTION OF THE DRAWINGS

FIG. 12 is a perspective view of an adapter that may be provided with the axle assembly.

FIG. 13 is a perspective view of a sun gear that may be provided with the axle assembly.

FIG. 14 is a perspective view of a shift collar that may be provided with the axle assembly.

FIG. 25 is a side view of the actuator arrangement in a first position.

FIG. 26 is a section view of a portion of the axle assembly showing the shift collar in the first position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
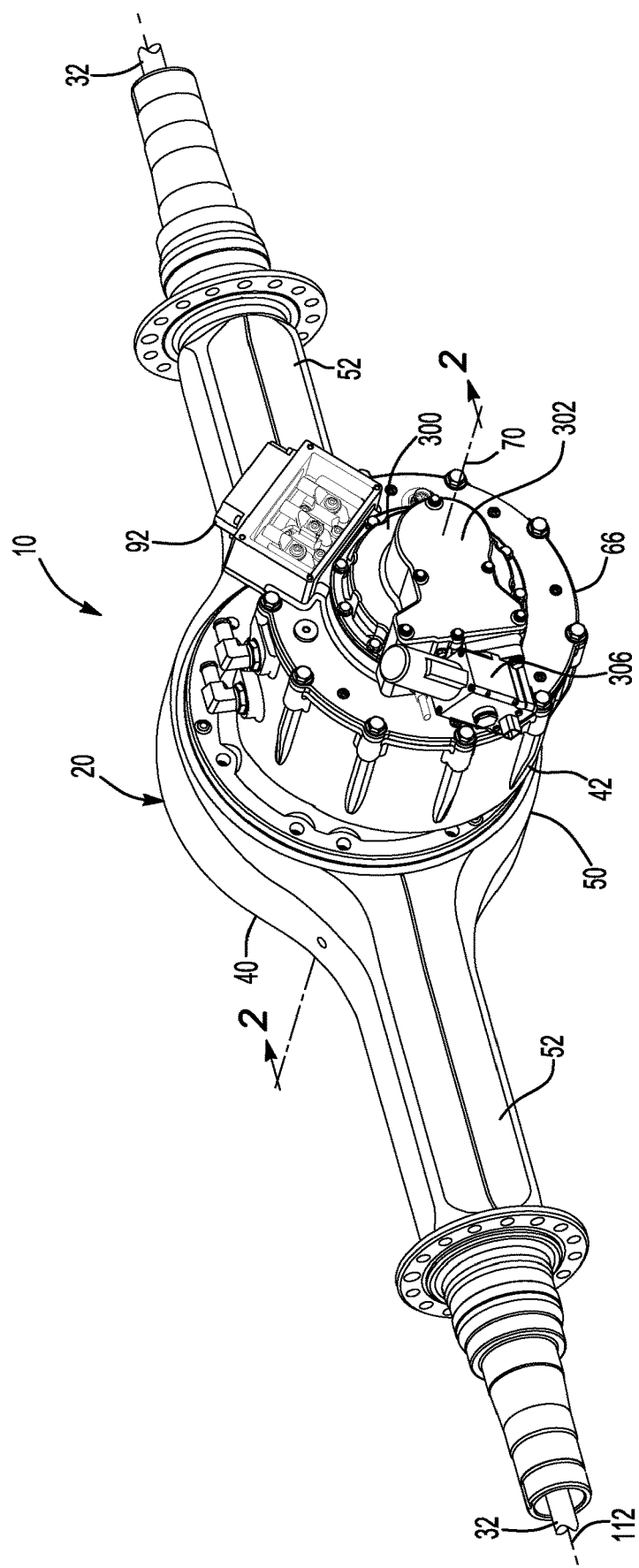
FIG. 1 is a perspective view of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire mounted on a wheel. One or more axle assemblies may be provided with the vehicle. As is best shown with reference to FIGS. 1 and 2, the axle assembly 10 may include a housing assembly 20, a drive pinion 22, an electric motor module 24, a gear reduction module 26, a shift mechanism 28, a differential assembly 30, and at least one axle shaft 32.

Referring to FIG. 1, the housing assembly 20 may receive various components of the axle assembly 10. In addition, the housing assembly 20 may facilitate mounting of the axle assembly 10 to the vehicle. In at least one configuration, the housing assembly 20 may include an axle housing 40 and a differential carrier 42.

The axle housing 40 may receive and support the axle shafts 32. In at least one embodiment, the axle housing 40 may include a center portion 50 and at least one arm portion 52.

Figure 2:
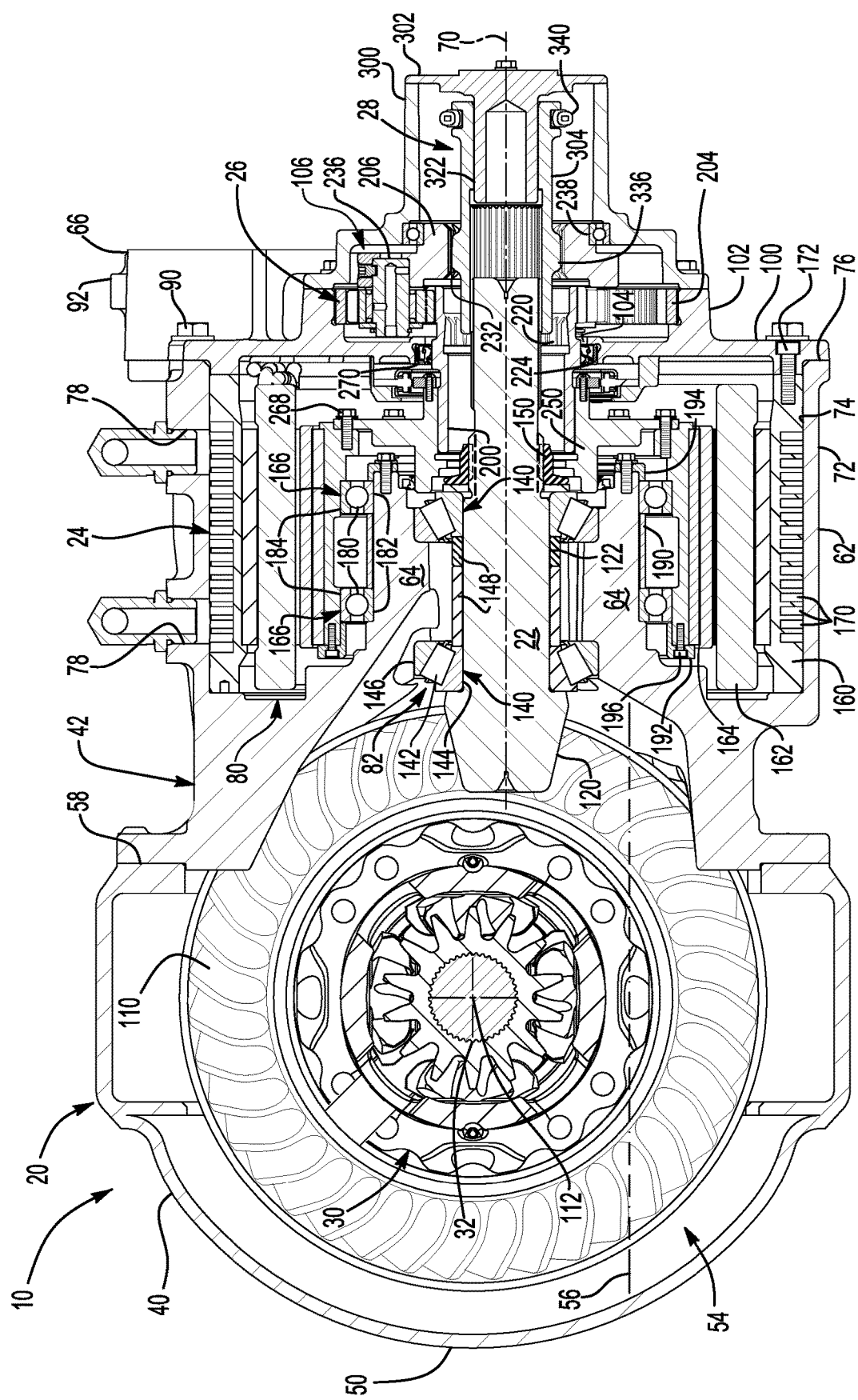
FIG. 2 is a section view of the axle assembly along section line 2-2 showing a shift collar in a first position.

The center portion 50 may be disposed proximate the center of the axle housing 40. The center portion 50 may define a cavity that may receive the differential assembly 30. As is best shown in FIG. 2, a lower region of the center portion 50 may at least partially define a sump portion 54 that may contain or receive lubricant 56. Splashed lubricant 56 may flow down the sides of the center portion 50 and may flow over internal components of the axle assembly 10 and gather in the sump portion 54.

The center portion 50 may include a carrier mounting surface 58. The carrier mounting surface 58 may face toward and may engage the differential carrier 42. The carrier mounting surface 58 may facilitate mounting of the differential carrier 42 to the axle housing 40. For example, the carrier mounting surface 58 may have a set of holes that may be aligned with corresponding holes on the differential carrier 42. Each hole may receive a fastener, such as a bolt, that may couple the differential carrier 42 to the axle housing 40.

Referring to FIG. 1, one or more arm portions 52 may extend from the center portion 50. For example, two arm portions 52 may extend in opposite directions from the center portion 50 and away from the differential assembly 30. The arm portions 52 may have substantially similar configurations. For example, the arm portions 52 may each have a hollow configuration or tubular configuration that may extend around the corresponding axle shaft 32 and may help separate or isolate the axle shaft 32 from the surrounding environment. An arm portion 52 or a portion thereof may be integrally formed with the center portion 50. Alternatively, an arm portion 52 may be separate from the center portion 50. In such a configuration, each arm portion 52 may be attached to the center portion 50 in any suitable manner, such as by welding or with one or more fasteners. Each arm portion 52 may define an arm cavity that may receive a corresponding axle shaft 32. It is also contemplated that the arm portions 52 may be omitted.

Referring to FIGS. 1 and 2, the differential carrier 42, which may also be called a carrier housing, may be mounted to the center portion 50 of the axle housing 40. The differential carrier 42 may include one or more components that may receive the electric motor module 24 and may support the differential assembly 30. As is best shown with reference to FIGS. 2 and 5, the differential carrier 42 may include one or more bearing supports 60, an exterior wall 62, and a bearing support wall 64. In addition, a differential carrier cover 66 may be disposed on the differential carrier 42 as is best shown with reference to FIG. 2.

Figure 5:
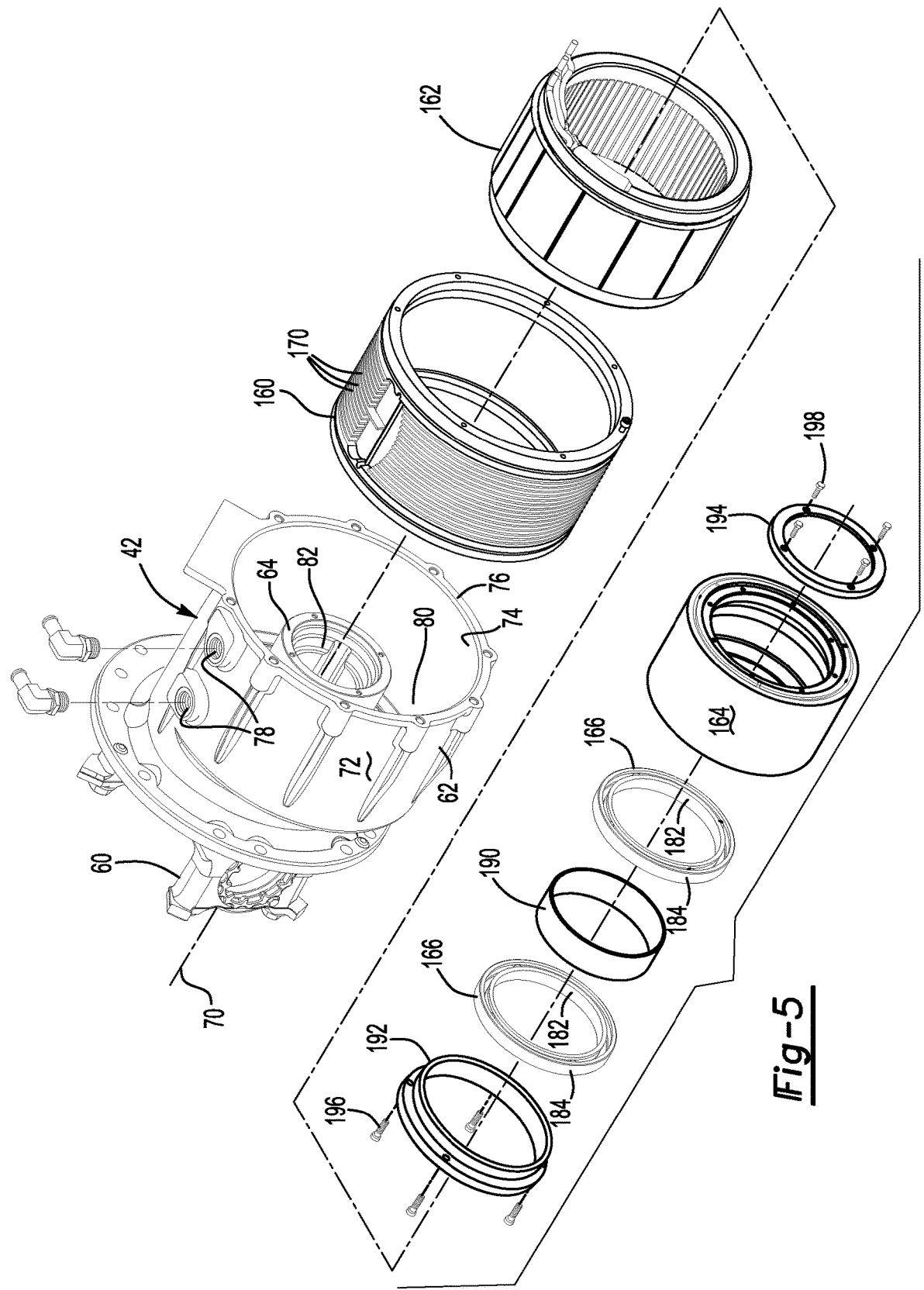
FIGS. 5-11 are exploded views of the axle assembly.

Referring to FIG. 5, the bearing support 60 may support a roller bearing assembly that may rotatably support the differential assembly 30. For example, two bearing supports 60 may be received in the center portion 50 and may be located proximate opposite sides of the differential assembly 30. The bearing support 60 may be provided in various configurations. For example, a bearing support 60 may include a pair of legs that extend from the differential carrier 42. A bearing cap may be mounted to the legs and may arch over a roller bearing assembly that may rotatably support the differential assembly 30. As another example, the bearing support 60 may be received in a roller bearing assembly which in turn may support the differential assembly 30.

The exterior wall 62 may extend away from the axle housing 40. The exterior wall 62 may extend around a first axis 70 and may have a generally cylindrical configuration. The exterior wall 62 may have an exterior surface 72, an interior surface 74, an end surface 76, and one or more ports 78.

The exterior surface 72 may face away from the first axis 70 and may define an exterior or outside surface of the differential carrier 42.

The interior surface 74 may be disposed opposite the exterior surface 72. The interior surface 74 may be disposed at a substantially constant radial distance from the first axis 70 in one or more configurations.

The end surface 76 may be disposed at an end of the differential carrier 42 that may be disposed opposite the axle housing 40. The end surface 76 may extend between the exterior surface 72 and the interior surface 74 and may facilitate mounting of the differential carrier cover 66 as will be discussed in more detail below.

One or more ports 78 may extend through the exterior wall 62. The ports 78 may be configured as a through holes that may extend from the exterior surface 72 to the interior surface 74. The ports 78 may allow coolant, such as a fluid like water, to flow to and from a water jacket as will be described in more detail below.

Referring to FIGS. 2 and 5, the bearing support wall 64, which may also be referred to as a pinion bearing cage, may extend away from the axle housing 40 and may extend around the first axis 70. The bearing support wall 64 may be spaced apart from the exterior wall 62 such that the exterior wall 62 may extend around the bearing support wall 64. In addition, the bearing support wall 64 may be radially positioned between the first axis 70 and the electric motor module 24 such that the bearing support wall 64 may support the electric motor module 24. The bearing support wall 64 may cooperate with the exterior wall 62 to at least partially define an outer cavity 80. The outer cavity 80 may extend around the first axis 70 and may receive the electric motor module 24 as will be discussed in more detail below. The bearing support wall 64 may be completely disposed inside the differential carrier 42 and may not extend to the differential carrier cover 66. As such, the bearing support wall 64 may be spaced apart from and may not engage the differential carrier cover 66. In addition, the bearing support wall 64 may define a hole 82. The hole 82 may be disposed opposite the outer cavity 80 and may extend around or along the first axis 70.

Figure 15:
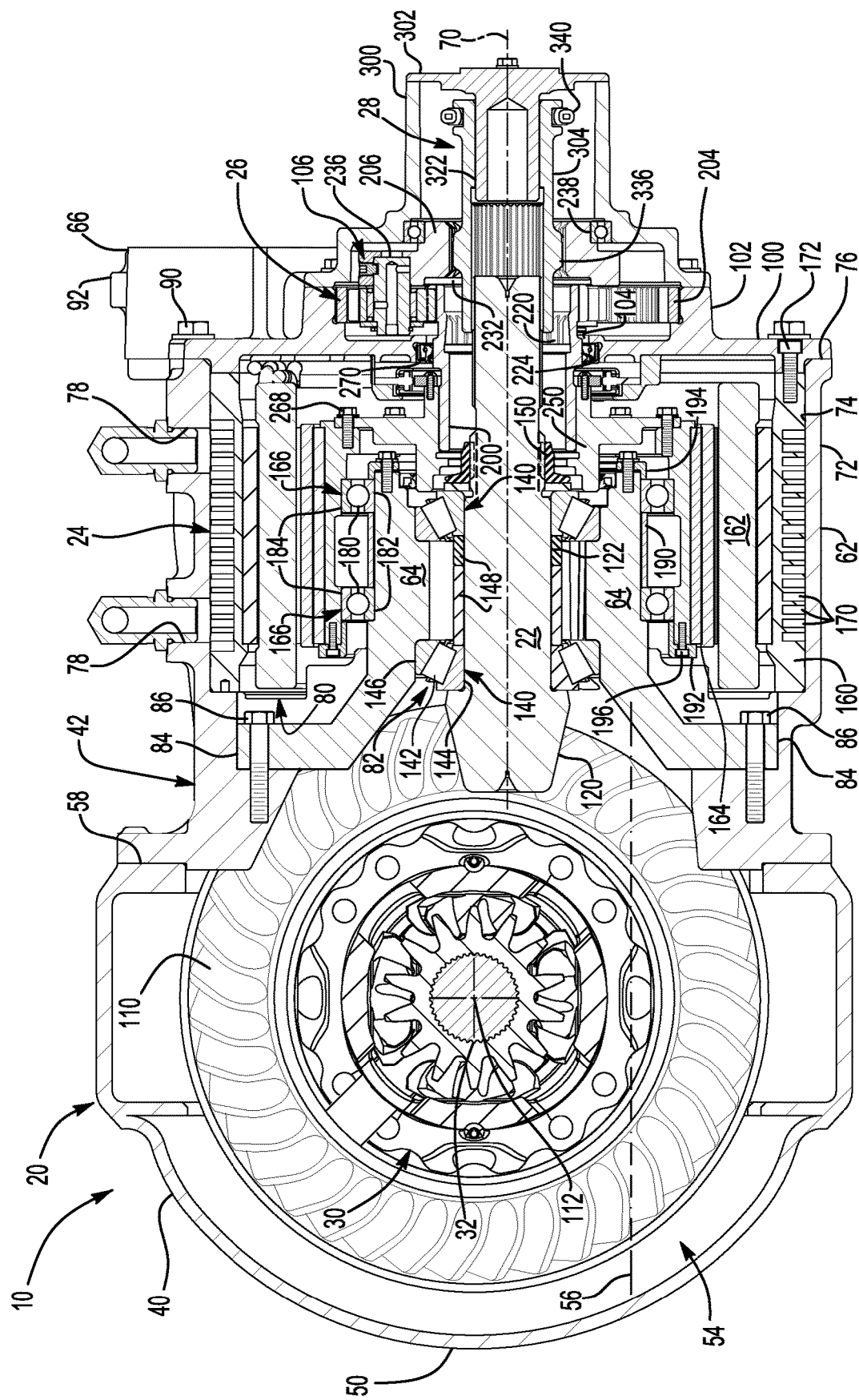
FIG. 15 is a section view of the axle assembly showing a differential carrier that has a bearing support wall that is a separate component from the differential carrier.
Figure 22:
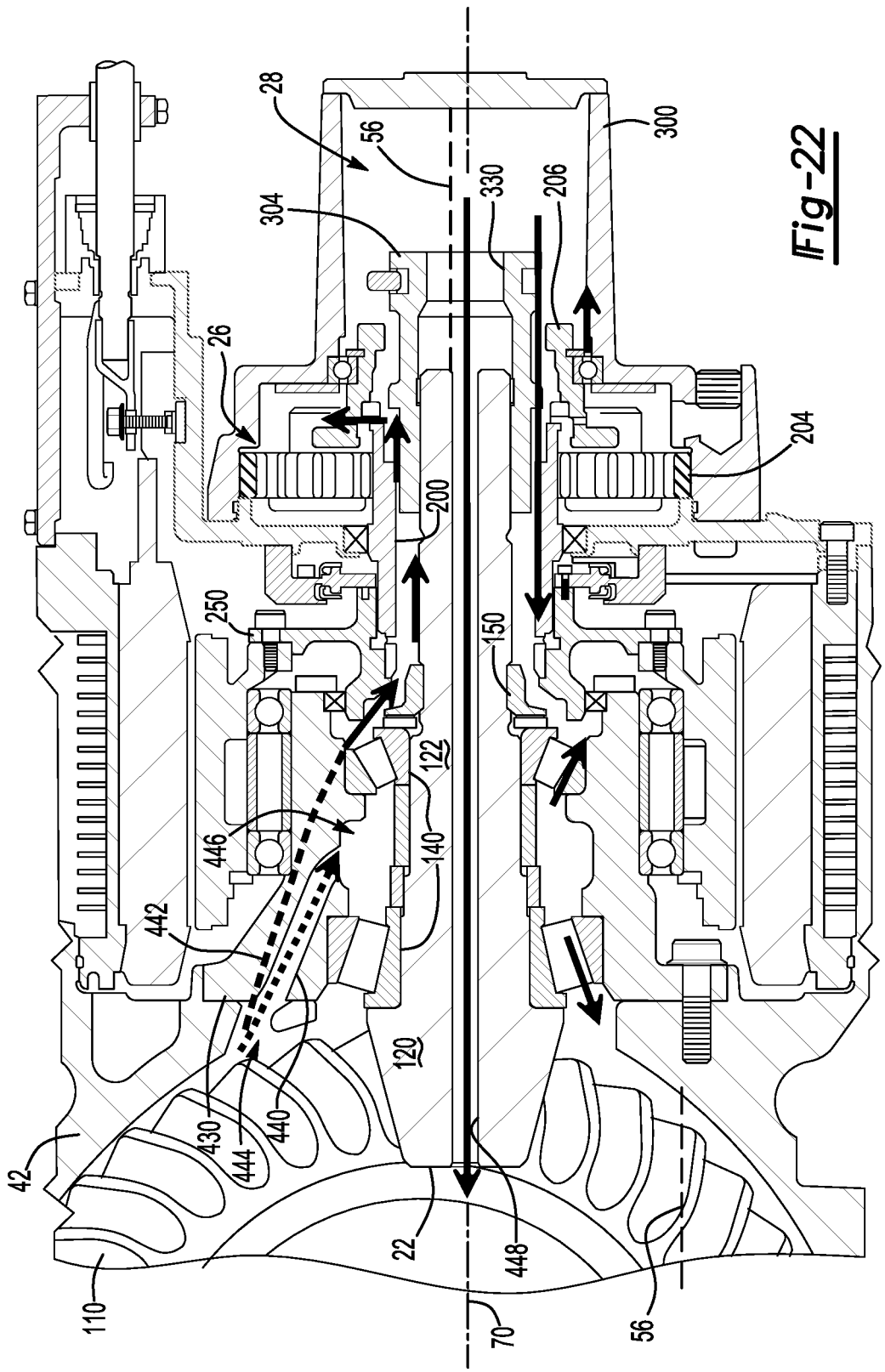
FIG. 22 is a section view of the axle assembly showing a hollow drive pinion and examples of lubricant flow in the axle assembly.

The bearing support wall 64 may be integrally formed with the differential carrier 42, such as is shown in FIG. 2. Alternatively, the bearing support wall 64 may be a separate component from the differential carrier 42, such as is shown in FIGS. 15 and 22. For example, the bearing support wall 64 may include a mounting flange 84 that may extend away from the first axis 70. The mounting flange 84 may be attached to the differential carrier 42 with a plurality of fasteners 86, such as bolts. For example, the fasteners 86 may be arranged around the first axis 70 and may extend through the mounting flange 84 and into the differential carrier 42. The fasteners 86 may be axially positioned or positioned along the first axis 70 between the axle housing 40 and the electric motor module 24.

Referring to FIGS. 1 and 2, a differential carrier cover 66 may be disposed on an end of the differential carrier 42 or the electric motor module 24 that may be disposed opposite the axle housing 40. For example, the differential carrier cover 66 may be mounted to the end surface 76 of the exterior wall 62. The differential carrier cover 66 may be fixedly attached to the exterior wall 62 in any suitable manner, such as with one or more differential carrier cover fasteners 90, such as bolts. As is best shown in FIG. 1, the differential carrier cover 66 may partially define a junction box or terminal box that may receive components that may facilitate electrical connections to the electric motor module 24. The differential carrier cover 66 may be disposed substantially perpendicular to the first axis 70.

The differential carrier cover 66 may be provided in various configurations. For example, the differential carrier cover 66 may enclose an end of the differential carrier 42 and may not support a gear reduction module 26 in a configuration where a gear reduction module is not provided. Alternatively, the differential carrier cover 66 may receive and/or support a gear reduction module 26. For instance, the differential carrier cover 66 may have a cover end wall 100 and a cover exterior wall 102 as is best shown with reference to FIGS. 2 and 8.

The cover end wall 100 may be disposed on and may be fastened to the end of the differential carrier 42. The cover end wall 100 may define a through hole 104 that may intersect the first axis 70.

The cover exterior wall 102 may extend from the cover end wall 100 in a direction that extends away from the differential carrier 42. The cover exterior wall 102 may extend around the first axis 70 and may have a generally cylindrical configuration. The cover exterior wall 102 may at least partially define a gear cavity 106. The gear cavity 106 may be disposed outside of the differential carrier 42 and may be disposed on an opposite side of the cover end wall 100 from the differential carrier 42.

Figure 6:
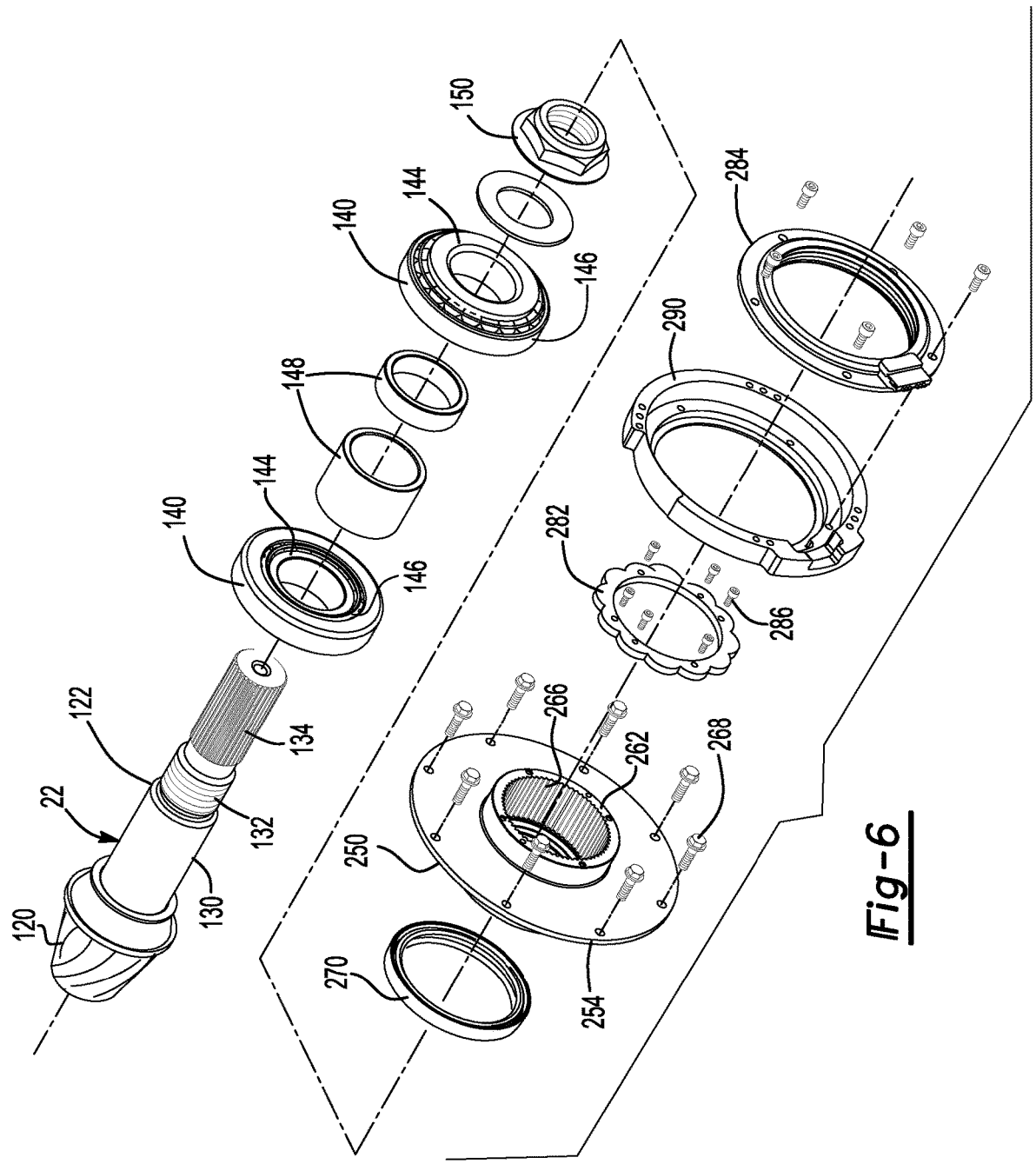
Figure 7:
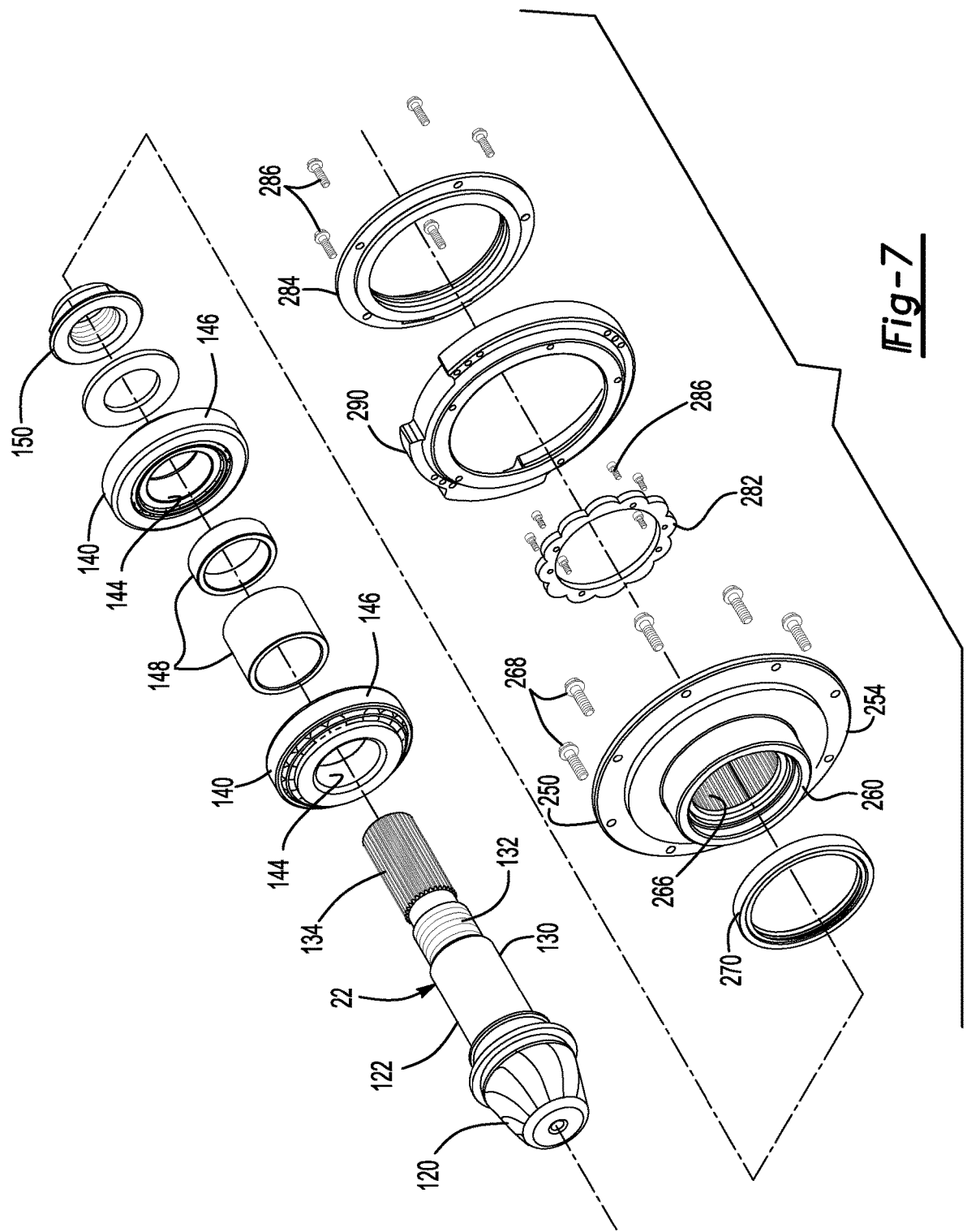

Referring to FIG. 2, the drive pinion 22 may provide torque to a ring gear 110 that may be provided with the differential assembly 30. The drive pinion 22 may extend along and may be rotatable about the first axis 70 while the ring gear 110 may be rotatable about a second axis 112. In addition, the drive pinion 22 may be received in and may extend through the hole 82 in the bearing support wall 64 and through the through hole 104 in the differential carrier cover 66. In at least one configuration, such as is best shown in FIGS. 2, 6 and 7, the drive pinion 22 may include a gear portion 120 and a shaft portion 122.

The gear portion 120 may be disposed at or near an end of the shaft portion 122. The gear portion 120 may have a plurality of teeth that may mate with corresponding teeth on the ring gear 110. The gear portion 120 may be integrally formed with the shaft portion 122 or may be provided as a separate component that may be fixedly disposed on the shaft portion 122.

The shaft portion 122 may extend from the gear portion 120 in a direction that extends away from the axle housing 40. As is best shown with reference to FIGS. 6 and 7, the shaft portion 122 may include an outer surface 130, a threaded portion 132, and a spline 134.

The outer surface 130 may extend from the gear portion 120 and may be an outside circumference of a portion of the shaft portion 122. One or more drive pinion bearings 140 may be disposed on the outer surface 130 and may rotatably support the drive pinion 22. The drive pinion bearings 140 may have any suitable configuration. For instance, the drive pinion bearings 140 may be configured as roller bearing assemblies that may each include a plurality of rolling elements 142 that may be disposed between an inner race 144 and an outer race 146. The inner race 144 may extend around and may be disposed on the outer surface 130. The outer race 146 may extend around the rolling elements 142 and may be disposed on bearing support wall 64 of the differential carrier 42 and may be received in the hole 82 of the bearing support wall 64. The drive pinion bearings 140 may be disposed at the same distance from the first axis 70 or different distances from the first axis 70. In the configuration shown in FIG. 22, a first drive pinion bearing 140 that may engage the gear portion 120 is disposed further from the first axis 70 than a second drive pinion bearing 140 that is disposed remotely from the gear portion 120. One or more spacer rings 148 may be disposed between the inner races 144 of the drive pinion bearings 140 to inhibit axial movement of the drive pinion bearings 140 toward each other.

The threaded portion 132 may be axially positioned between the outer surface 130 and the spline 134. A preload nut 150 may be threaded onto the threaded portion 132 and may apply a preload force on the drive pinion bearings 140.

The spline 134 may be disposed between the threaded portion 132 and an end of the shaft portion 122 that may be disposed opposite the gear portion 120. The spline 134 may include a plurality of teeth. The teeth may be disposed substantially parallel to the first axis 70 and may mate with a corresponding spline on a shift collar of the shift mechanism 28 as will be discussed in more detail below. Alternatively, the teeth of the spline 134 may mate with a corresponding spline of an adapter that may couple the drive pinion 22 to a rotor of the electric motor module 24 when the gear reduction module 26 and shift mechanism 28 are omitted.

Referring to FIG. 2, the electric motor module 24 may be operatively connected to the differential assembly 30 and may provide torque to the differential assembly 30 via the drive pinion 22. The electric motor module 24 may be received inside the differential carrier 42. For example, the electric motor module 24 may be received in the outer cavity 80 of the differential carrier 42. In addition, the electric motor module 24 may be axially positioned between the differential carrier cover 66 and the axle housing 40. As such, the electric motor module 24 may be completely received inside of the differential carrier 42. Positioning the electric motor module 24 inside the differential carrier 42, as opposed to being mounted outside or to an end of the differential carrier 42, may help reduce the axial length or standout of the axle assembly 10, which may reduce package space, and may position the center of mass of the axle assembly 10 closer to the axle housing 40 and the second axis 112, which may help with balancing and mounting of the axle assembly 10. In at least one configuration, the electric motor module 24 may include a water jacket 160, a stator 162, a rotor 164, and one or more rotor bearings 166.

Referring to FIGS. 2 and 5, the water jacket 160 may help cool or remove heat from the stator 162. The water jacket 160 may be received in the outer cavity 80 and may extend around the first axis 70 and the stator 162. For example, the water jacket 160 may be press fit into the outer cavity 80 such that the water jacket 160 may be disposed against the interior surface 74 of the exterior wall 62 of the differential carrier 42. As such, water jacket 160 may be radially positioned between the exterior wall 62 and the stator 162.

In at least one configuration, the water jacket 160 may include a plurality of channels 170 that may extend around the first axis 70. Coolant may be provided to the water jacket 160 via a first port 78 and may exit the water jacket 160 via a second port 78. For instance, coolant may flow from the first port 78 to the channels 170, receive heat as the coolant flows through the channels 170 and around the first axis 70, and exit at the second port 78. The water jacket 160 may extend axially from the differential carrier 42 to the differential carrier cover 66. The water jacket 160 may be fastened to the differential carrier cover 66 with one or more fasteners 172, such as bolts, that may extend through openings in the differential carrier cover 66 and into the water jacket 160. As another option, the water jacket or features of the water jacket like the channels 170 may be integrally formed with the differential carrier 42 rather than being provided as a separate component.

The stator 162 may be fixedly positioned with respect to the differential carrier 42. For example, the stator 162 may be received inside and may be fixedly disposed on the water jacket 160. The stator 162 may extend around the first axis 70 and may include a plurality of windings as is known by those skilled in the art.

The rotor 164 may extend around the first axis 70 and may be received inside the stator 162. The rotor 164 may be spaced apart from but disposed in close proximity to the stator 162. The rotor 164 may be rotatable about the first axis 70 with respect to the stator 162 and may include magnets or ferromagnetic material that may facilitate the generation of electrical current. The rotor 164 may be rotatably supported by the bearing support wall 64 and may be radially positioned between the bearing support wall 64 and the stator 162. The rotor 164 may be operatively connected to the drive pinion 22 with or without a gear reduction module 26. For instance, the rotor 164 may be operatively connected to the drive pinion 22 between the end of the bearing support wall 64 and the differential carrier cover 66, such as with an adapter as will be discussed in more detail below.

One or more rotor bearings 166 may rotatably support the rotor 164. In the configuration shown, two rotor bearings 166 are provided that may be spaced apart from each other. For convenience in reference, the rotor bearing 166 that may be disposed closest to the axle housing 40 may be referred to as a first rotor bearing while the rotor bearing 166 that may be disposed closest to the differential carrier cover 66 may be referred to as a second rotor bearing. The rotor bearings 166 may have any suitable configuration. For instance, the rotor bearings 166 may be configured as roller bearing assemblies that may each include a plurality of rolling elements 180 that may be disposed between an inner race 182 and an outer race 184. The inner race 182 may extend around and may receive the bearing support wall 64. The outer race 184 may extend around the rolling elements 180 and may be disposed on the rotor 164.

Various components may help position the rotor bearings 166 and inhibit axial movement of the rotor bearings 166 with respect to the bearing support wall 64 and/or inhibit axial movement of the rotor 164 with respect to the rotor bearings 166. These components may include a spacer ring 190, a first retaining member 192, and a second retaining member 194.

The spacer ring 190 may be disposed between the rotor bearings 166. For example, the spacer ring 190 may extend around the bearing support wall 64 and may engage the inner races 182 of the rotor bearings 166 to inhibit axial movement of the rotor bearings 166 toward each other.

The first retaining member 192 may inhibit axial movement of the rotor 164 toward the axle housing 40. In at least one configuration, the first retaining member 192 may be configured as a ring that may extend around the first axis 70 and that may have a generally L-shaped cross-section. The first retaining member 192 may be fixedly disposed on the rotor 164 in any suitable manner. For example, one or more fasteners 196, such as bolts, may couple the first retaining member 192 to the rotor 164. The first retaining member 192 may extend to the outer race 184 of the first rotor bearing 166, thereby inhibiting axial movement.

The second retaining member 194 may inhibit axial movement of the rotor 164 and one or more rotor bearings 166 away from the axle housing 40. In at least one configuration, the second retaining member 194 may be configured as a ring that may extend around the first axis 70 and that may have a generally L-shaped cross-section. The second retaining member 194 may be fixedly disposed on the bearing support wall 64 in any suitable manner. For example, one or more fasteners 198, such as bolts, may couple the second retaining member 194 to an end of the bearing support wall 64. The second retaining member 194 may extend to the inner race 182 of the second rotor bearing 166, thereby inhibiting axial movement.

Referring to FIG. 2, the gear reduction module 26, if provided, may transmit torque from the electric motor module 24 to the differential assembly 30. As such, the gear reduction module 26 may be operatively connected to the electric motor module 24 and the differential assembly 30. The gear reduction module 26 may be primarily disposed outside of the differential carrier 42, thereby providing a modular construction that may be mounted to the differential carrier 42 when gear reduction is desired. Such a configuration may allow for a standardized construction of the differential carrier 42 and/or the electric motor module 24.

The gear reduction module 26 may be disposed adjacent to and may be mounted to the differential carrier cover 66. In addition, the gear reduction module 26 may be primarily received or at least partially received in the gear cavity 106 of the differential carrier cover 66. As such, the gear reduction module 26 may be primarily disposed outside of the differential carrier 42.

The gear reduction module 26 may be provided in various configurations, such as planetary gear set configurations and non-planetary gear set configurations. Referring to FIGS. 2-9, an example of a gear reduction module 26 that has a planetary gear set configuration is shown. In such a configuration, the gear reduction module may include a sun gear 200, at least one planet gear 202, a planetary ring gear 204, and a planet gear carrier 206.

Figure 8:
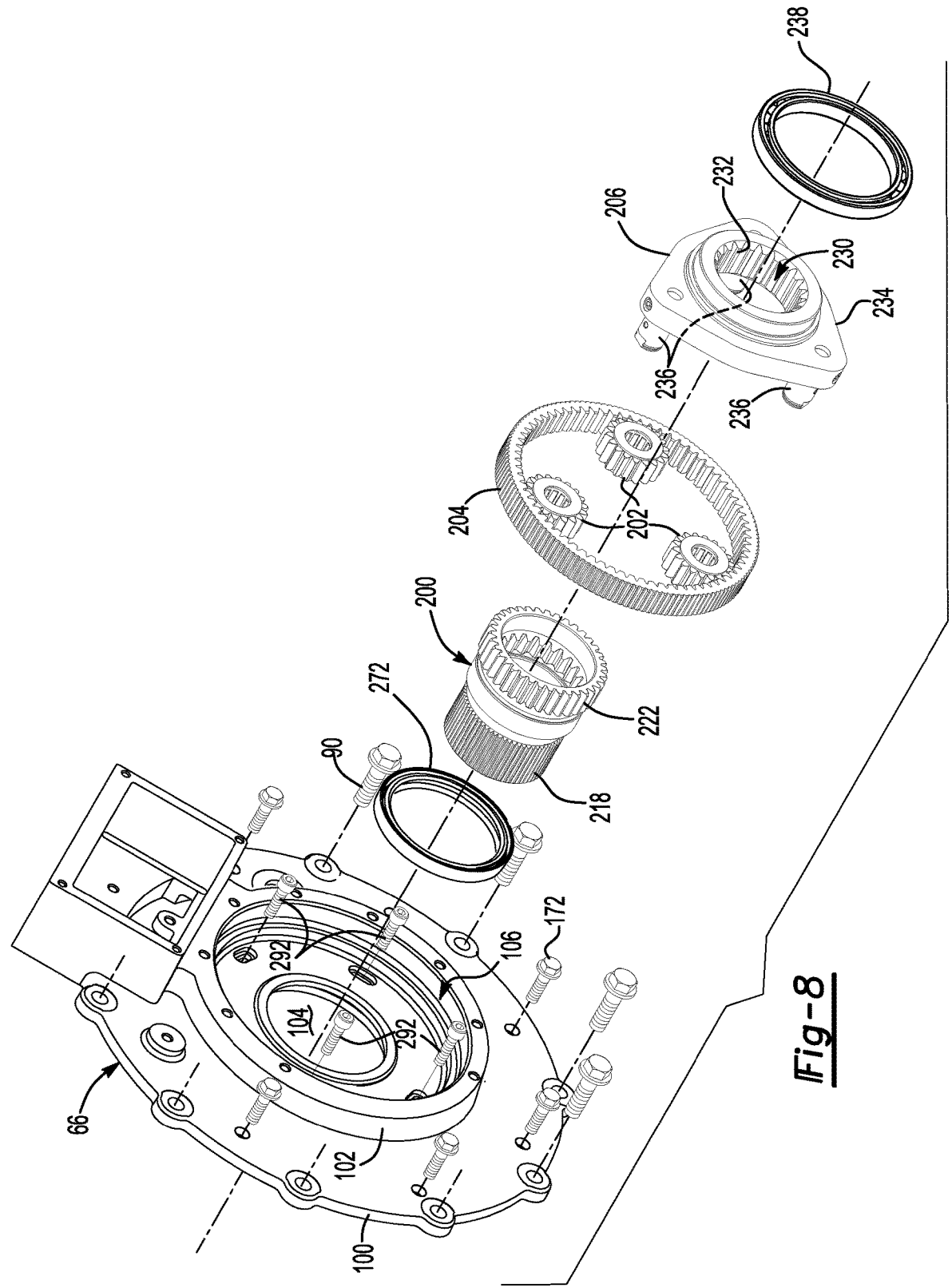

Referring to FIGS. 2, 8 and 13, the sun gear 200 may be disposed proximate the center of the planetary gear set and may be rotatable about the first axis 70. In addition, the sun gear 200 may extend through the through hole 104 in the cover end wall 100 of the differential carrier cover 66. As is best shown primarily with reference to FIG. 13, the sun gear 200 may be a hollow tubular body that may include a first end surface 210, a second end surface 212, a sun gear hole 214, an enlarged portion 216, a sun gear spline 218, a first gear portion 220, a second gear portion 222, and a seal mounting surface 224.

The first end surface 210 may be disposed at an end of the sun gear 200 that may face toward the axle housing 40. The first end surface 210 may be disposed in the differential carrier 42.

The second end surface 212 may be disposed at an end of the sun gear 200 that may face away from the axle housing 40. As such, the second end surface 212 may be disposed opposite the first end surface 210. The second end surface 212 may be disposed in the gear cavity 106 of the differential carrier cover 66.

The sun gear hole 214 may extend from the first end surface 210 to the second end surface 212. The sun gear hole 214 may extend along and may be centered about the first axis 70. The drive pinion 22 may extend through the sun gear hole 214 and may be spaced apart from the sun gear 200.

The enlarged portion 216 may be a portion of the sun gear hole 214 that may extend from the second end surface 212 to the first gear portion 220. The enlarged portion 216 may have a larger diameter than the first gear portion 220 and a larger diameter than a shift collar that may selectively couple the gear reduction module 26 to the drive pinion 22 as will be discussed in more detail below.

The sun gear spline 218 may facilitate coupling of the sun gear 200 to an adapter as will be discussed in more detail below. In at least one configuration, the sun gear spline 218 may be disposed opposite the sun gear hole 214 and may extend from or may be disposed adjacent to the first end surface 210. As such, the sun gear spline 218 may be received inside the adapter 250. It is also contemplated that the sun gear spline 218 may be disposed in the sun gear hole 214. In such a configuration, the adapter may be received inside the first gear portion 220.

The first gear portion 220 may be disposed in the sun gear hole 214 between the first end surface 210 and the enlarged portion 216. Teeth of the first gear portion 220 may be arranged around the first axis 70 and may extend toward the first axis 70.

The second gear portion 222 may be disposed proximate the second end surface 212 of the sun gear 200. The second gear portion 222 may have teeth that may mesh with teeth of the planet gears 202. The teeth of the second gear portion 222 may be arranged around the first axis 70 and may extend away from the first axis 70.

The seal mounting surface 224 may be disposed between the sun gear spline 218 and the second gear portion 222. The seal mounting surface 224 may be a generally smooth surface that may face away from the first axis 70 and that may extend around the first axis 70.

Figure 9:
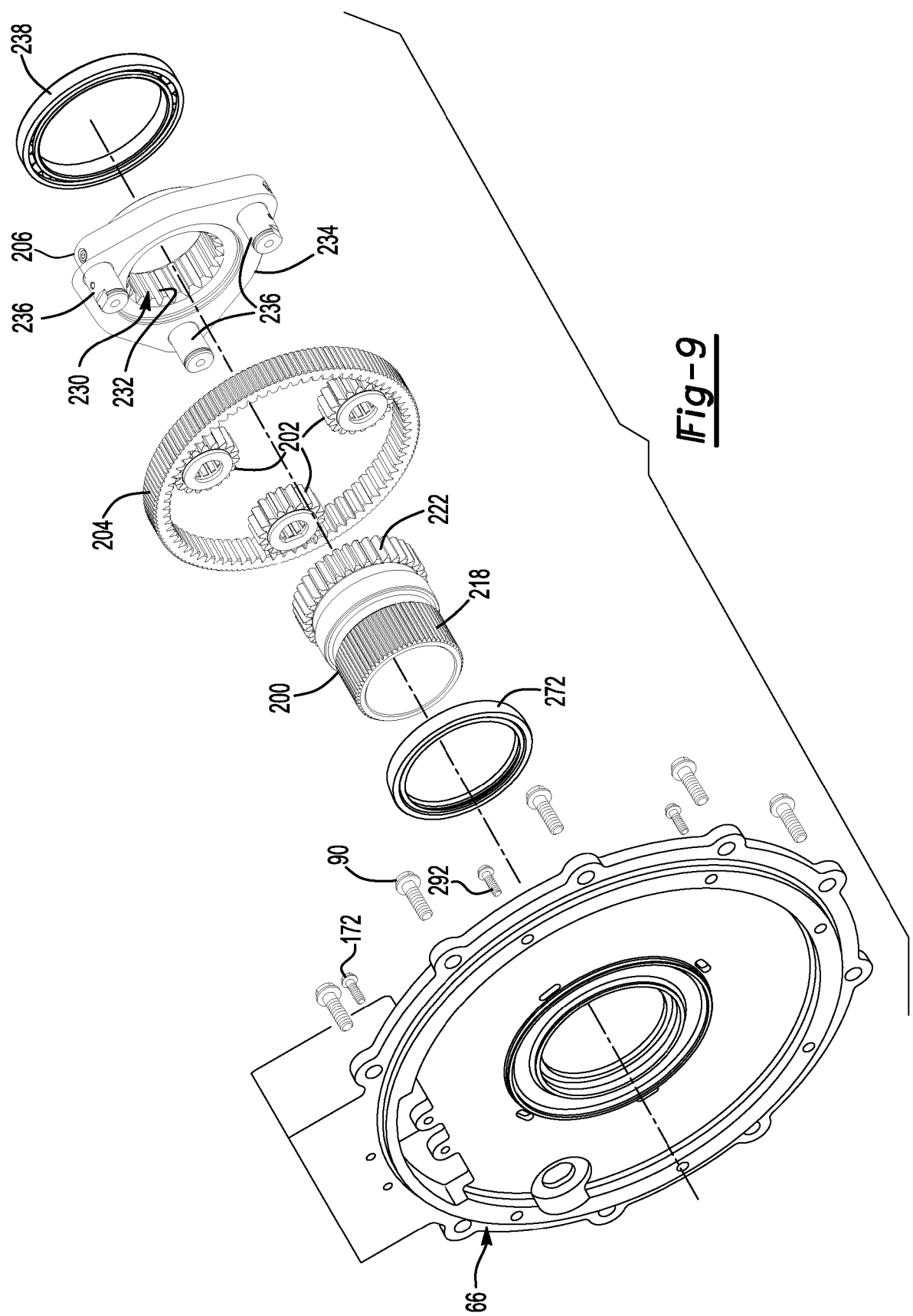

Referring to FIGS. 2, 8 and 9, one or more planet gears 202 may be rotatably disposed between the sun gear 200 and the planetary ring gear 204. Each planet gear 202 may have a hole and a set of teeth. The hole may be a through hole that may extend through the planet gear 202. The set of teeth may be disposed opposite the hole. The set of teeth may mesh with teeth of the second gear portion 222 of the sun gear 200 and teeth on the planetary ring gear 204. Each planet gear 202 may be configured to rotate about a different planet pinion axis. The planet pinion axes may extend substantially parallel to the first axis 70.

The planetary ring gear 204 may extend around the first axis 70 and may receive the planet gears 202. The planetary ring gear 204 may include a plurality of teeth that may extend toward the first axis 70 and may mesh with teeth on the planet gears 202. The planetary ring gear 204 may be fixedly positioned with respect to the differential carrier cover 66 and the first axis 70. For example, the planetary ring gear 204 may be received in the gear cavity 106 of the differential carrier cover 66 and may be fixedly disposed in the differential carrier cover 66 such that an outside circumference of the planetary ring gear 204 may be disposed on a side of the cover exterior wall 102 that faces toward the first axis 70.

The planet gear carrier 206 may be rotatable about the first axis 70 and may rotatably support the planet gears 202. In at least one configuration, the planet gear carrier 206 may include a planet gear carrier hole 230, a planet gear carrier gear portion 232, a planet gear carrier flange 234, and one or more pins 236.

The planet gear carrier hole 230 may be a through hole that may extend through planet gear carrier 206. The planet gear carrier hole 230 may extend along and may be centered about the first axis 70.

The planet gear carrier gear portion 232 may be disposed in the planet gear carrier hole 230. Teeth of the planet gear carrier gear portion 232 may be arranged around the first axis 70 and may extend toward the first axis 70.

The planet gear carrier flange 234 may be disposed on a side of the planet gear carrier 206 that may face away from the planet gears 202. A roller bearing assembly 238 may extend around the planet gear carrier flange 234 to rotatably support the planet gear carrier 206. The roller bearing assembly 238 may be disposed between the planet gear carrier flange 234 and a shift mechanism housing 300 that may be disposed on the differential carrier cover 66.

One or more pins 236 may rotatably support the planet gears 202. For example, a pin 236 may extend into or through the hole in a corresponding planet gear 202. A roller bearing may extend around each pin 236 and may be disposed between the pin 236 and a corresponding planet gear 202 in one or more embodiments.

Figure 16:
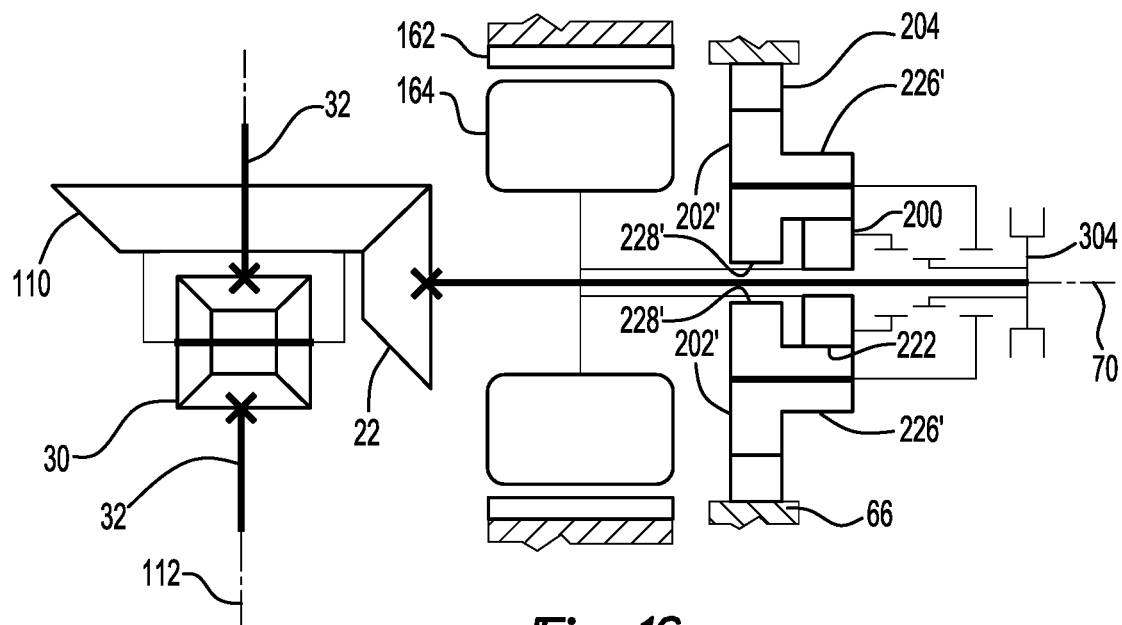
FIG. 16 is a schematic representation of compound planetary gear set that may be provided with a gear reduction module.

Referring to FIG. 16, an example of a gear reduction module that has a compound planetary gear set is shown. A compound planetary gear set configuration may include a sun gear 200, a planetary ring gear 204, and a planet gear carrier 206 as previously described. One or more planet gears 202' may be rotatably disposed between the sun gear 200 and the planetary ring gear 204. Each planet gear 202' may have a hole, a first set of teeth 226', and a second set of teeth 228'. The hole may be a through hole that may extend through the planet gear 202'. The first set of teeth 226' may be disposed opposite the hole and may mesh with teeth of the second gear portion 222 of the sun gear 200. The second set of teeth 228' may also be disposed opposite the hole and may mesh with the teeth of the planetary ring gear 204. The second set of teeth 228' may be arranged at a greater radial distance from the rotational axis of the planet gear 202' than the first set of teeth 226'.

Figure 17:
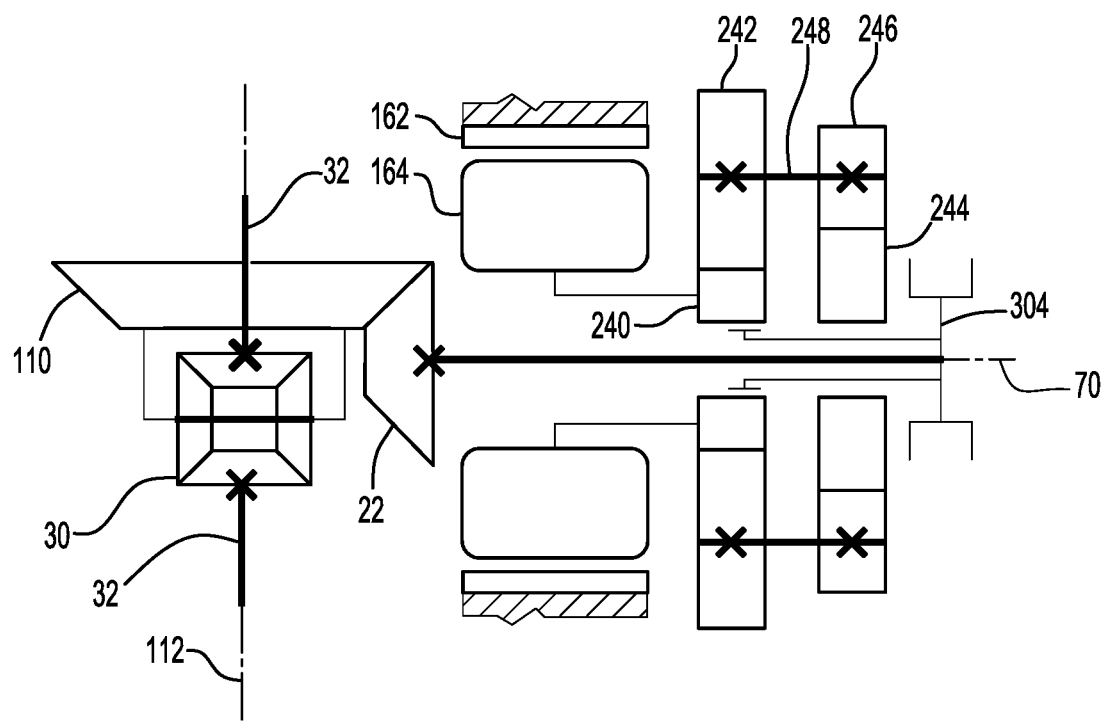
FIG. 17 is a schematic representation of a countershaft gear arrangement that may be provided with the gear reduction module.

Referring to FIG. 17, an example of a gear reduction module that has a countershaft gear arrangement is shown. In a countershaft arrangement, a plurality of gear sets, such as two sets of gears may be axially positioned adjacent to each other. The first set of gears may include a first inner gear 240 that may mesh with teeth on at least one first outer gear 242. The second set of gears may include a second inner gear 244 that may mesh with teeth on at least one second outer gear 246. The first inner gear 240 and the second inner gear 244 may be rotatable about the first axis 70. The first inner gear 240 may have a smaller diameter than the second inner gear 244. The first outer gear 242 may have a larger diameter than the second outer gear 246. A first outer gear 242 may be connected to a corresponding second outer gear 246 with a countershaft 248, which may also be called a layshaft, such that the first outer gear 242 and the second outer gear 246 may rotate about a common axis that may be spaced apart from the first axis 70. A shift collar 304 may selectively engage the first inner gear 240 or the second inner gear 244 to provide different gear ratios to the drive pinion 22. It is also contemplated that a countershaft gear arrangement may include a single countershaft rather than multiple countershafts as shown in FIG. 17.

Referring to FIGS. 2, 6, 7 and 12, an adapter 250 may couple the electric motor module 24 to the gear reduction module 26. For example, the adapter 250 may couple the rotor 164 to the sun gear 200. The adapter 250 may be disposed inside the differential carrier 42 and may be axially positioned between the axle housing 40 and the differential carrier cover 66. In at least one configuration, the adapter 250 may include a tubular body 252 and a flange portion 254.

The tubular body 252 may have a first end 260 and a second end 262 that may be disposed opposite the first end 260. The tubular body 252 may define an adapter hole 264 that may extend from the first end 260 to the second end 262. The adapter hole 264 may be a through hole that may extend along and may be centered about the first axis 70. The drive pinion 22 may extend through the adapter hole 264 and may be spaced apart from the adapter 250. The sun gear 200 may be received in the adapter hole 264. For example, the tubular body 252 may include an adapter spline 266 that may be disposed in the adapter hole 264. The adapter spline 266 may have teeth that may be arranged around the first axis 70 and may extend toward the first axis 70. The teeth of the adapter spline 266 may mate with the teeth of the sun gear spline 218 such that the adapter 250 may rotate about the first axis 70 with the sun gear 200 and the rotor 164.

The flange portion 254 may be disposed between the first end 260 and the second end 262 of the tubular body 252. The flange portion 254 may extend from the tubular body 252 in a direction that extends away from the first axis 70. The flange portion 254 may be fixedly coupled to the rotor 164. For instance, the flange portion 254 may include a set of holes that may be arranged around the first axis 70 and that may receive fasteners 268, such as bolts, that may extend through the holes to couple the flange portion 254 to the rotor 164.

Referring to FIGS. 2, 6 and 7, an adapter seal 270 may be disposed on the tubular body 252. The adapter seal 270 may be disposed proximate the first end 260 of the tubular body 252 and may extend around the tubular body 252. The adapter seal 270 may extend from the adapter 250 to the bearing support wall 64 of the differential carrier 42. As such, the adapter seal 270 may separate the outer cavity 80 of the differential carrier 42 from the hole 82 in the bearing support wall 64 to inhibit lubricant 56 from entering the outer cavity 80 and from flowing to the electric motor module 24.

Referring to FIGS. 2, 8 and 9, a sun gear seal 272 may also be provided to inhibit lubricant 56 from entering the outer cavity 80. The sun gear seal 272 may be disposed on and may extend around the seal mounting surface 224 of the sun gear 200. The sun gear seal 272 may extend from the sun gear 200 to the differential carrier cover 66. For example, the sun gear seal 272 may be received in the through hole 104 of the cover end wall 100 of the differential carrier cover 66.

Referring to FIGS. 2, 6 and 7 a rotary encoder 280 may be associated with the electric motor module 24. The rotary encoder 280 may be disposed near the electric motor module 24 and may also be isolated from the lubricant 56 due to the sealing provided by the adapter seal 270 and the sun gear seal 272. The rotary encoder 280 may be provided to detect rotation of the rotor 164. In at least one configuration, the rotary encoder 280 may include a rotary disc 282 and a sensor 284.

The rotary disc 282 may rotate about the first axis 70 with the rotor 164. The rotary disc 282 may be provided in any suitable location. In the configuration shown, the rotary disc 282 is fixedly mounted to the second end 262 of the tubular body 252 of the adapter 250 with fasteners 286, such as bolts. As such, the rotary disc 282 may extend around the sun gear 200 and may rotate with the rotor 164 and the adapter 250. In addition, the rotary disc 282 may be axially positioned between the flange portion 254 of the adapter 250 and the differential carrier cover 66. As such, the rotary disc 282 may be positioned between the bearing support wall 64 of the differential carrier 42 and the differential carrier cover 66. The rotary disc 282 may have a non-cylindrical outer surface that may face away from the first axis 70 that may include a plurality of protrusions that may extend away from the first axis 70.

The sensor 284 may extend around the rotary disc 282. The sensor 284 may detect rotation of the rotary disc 282 by detecting the presence or absence of the protrusions of the rotary disc 282. The sensor 284 may communicate with an electronic controller that may control operation of the electric motor module 24. The sensor 284 may have any suitable configuration. In the configuration shown, the sensor 284 is configured as a ring that may extend around the first axis 70. The sensor 284 may be fixedly mounted to a mounting plate 290, which in turn may be fixedly mounted to the differential carrier cover 66 with one or more fasteners 292, such as bolts, which are best shown in FIG. 8.

Referring to FIG. 2, the shift mechanism 28 may be disposed at an end of the axle assembly 10 that may be disposed opposite the axle housing 40. For example, the shift mechanism 28 may be disposed on the differential carrier cover 66.

The gear reduction module 26 may cooperate with the shift mechanism 28 to provide a desired gear reduction ratio to change the torque provided from the electric motor module 24 to the differential assembly 30, and hence to the axle shafts 32 of the axle assembly 10. For example, the gear reduction module 26 may provide a first drive gear ratio and a second drive gear ratio. The first drive gear ratio, which may be referred to as a low range gear ratio, may provide gear reduction from the electric motor module 24 to the differential assembly 30 and hence to the axle shafts 32. As a nonlimiting example, the first drive gear ratio may provide a 2:1 gear ratio or more. The first drive gear ratio may provide increased torque to a vehicle traction wheel as compared to the second drive gear ratio. The second drive gear ratio, which may be referred to as a high range gear ratio, may provide a different gear reduction ratio or lesser gear reduction ratio than the first drive gear ratio. For instance, the second drive gear ratio may provide a 1:1 gear ratio. The second drive gear ratio may facilitate faster vehicle cruising or a cruising gear ratio that may help improve fuel economy. In addition, a neutral drive gear ratio or neutral position may be provided in which torque may not be provided to the differential assembly 30 by the electric motor module 24.

Figure 10:
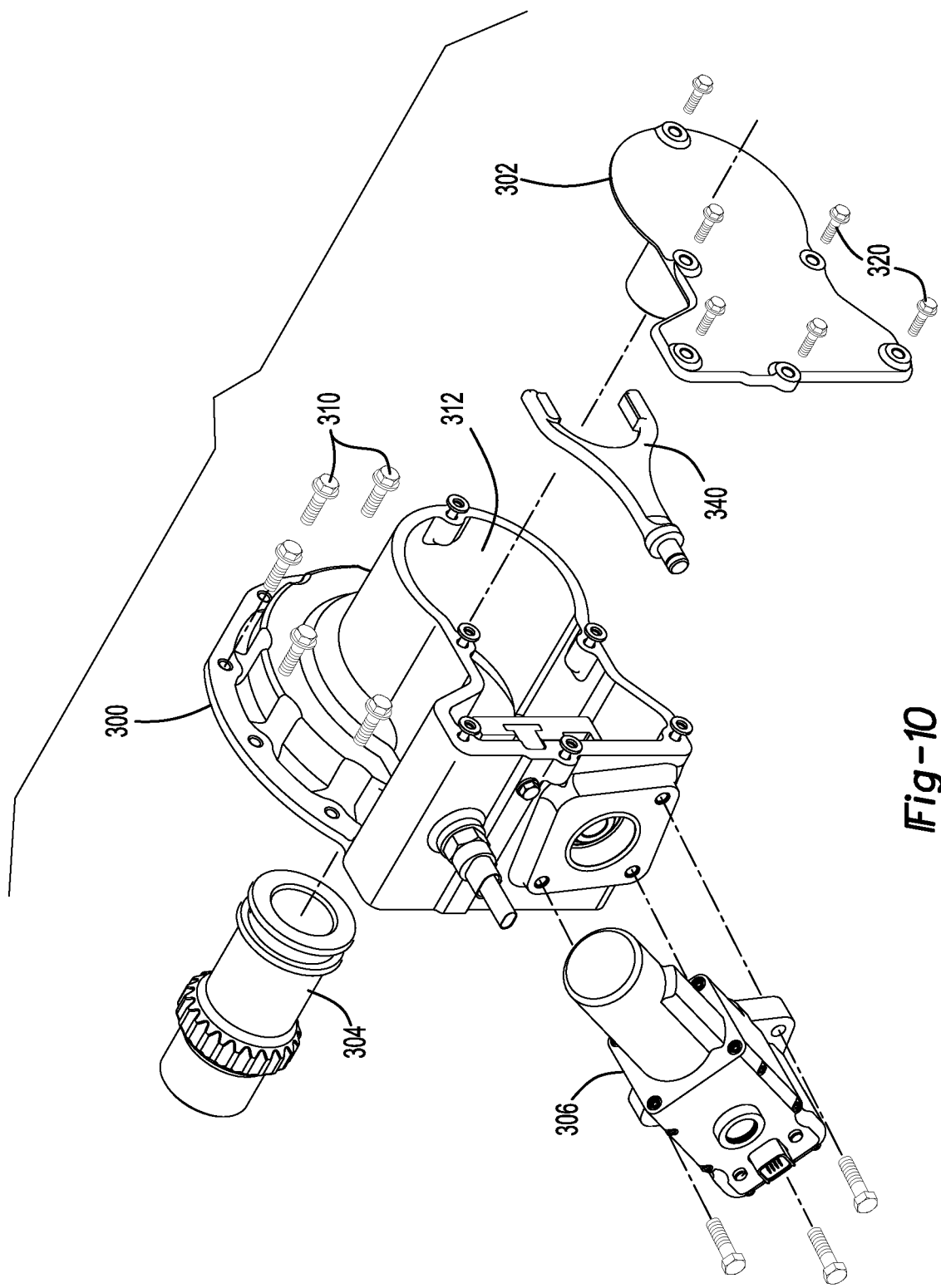
Figure 11:
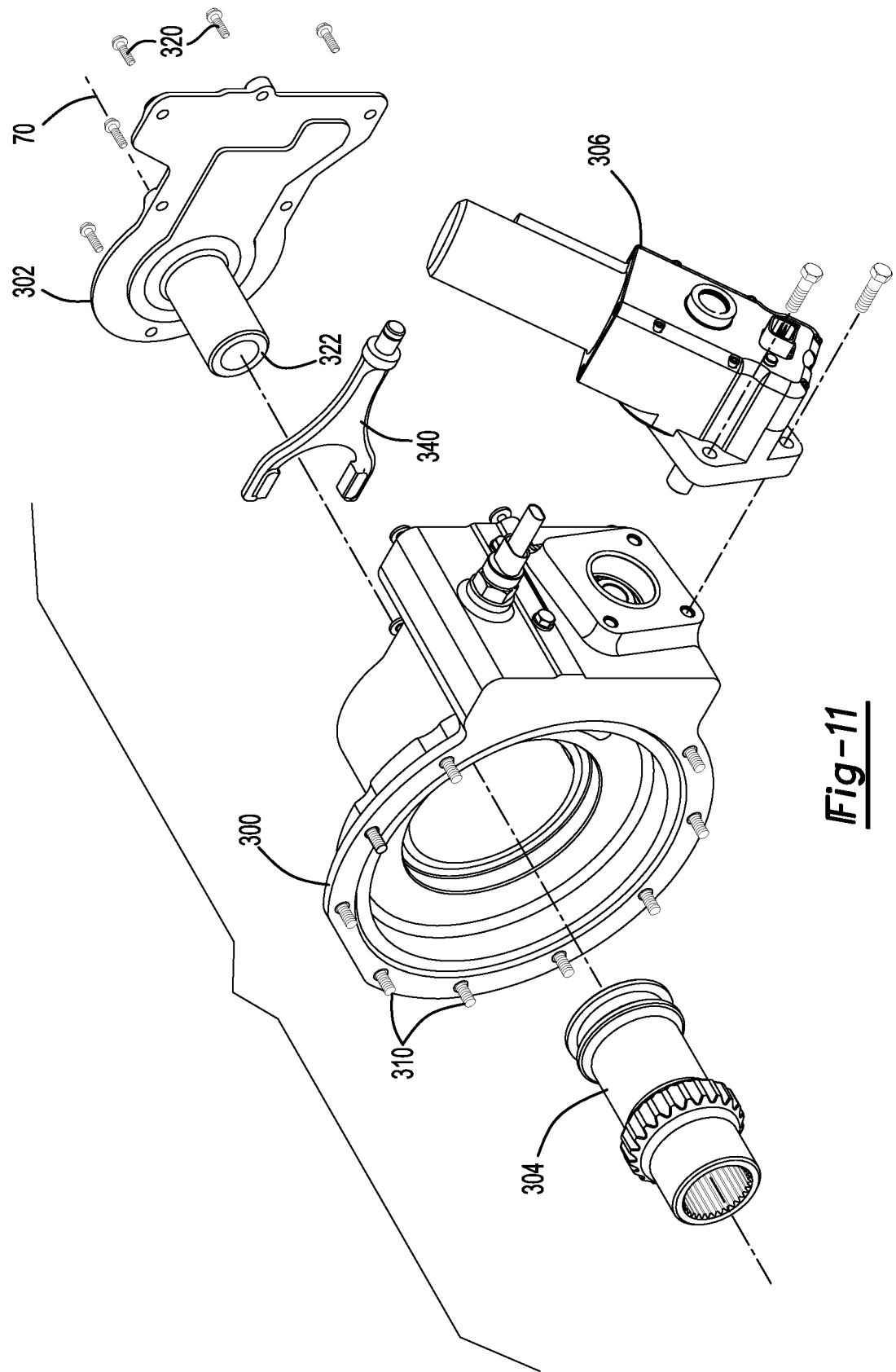

Referring to FIGS. 2, 10 and 11, the gear reduction module 26 may include a shift mechanism housing 300, an end plate 302, a shift collar 304, and an actuator 306.

The shift mechanism housing 300 may be disposed on the differential carrier cover 66 and may be mounted to a side of the differential carrier cover 66 that may be disposed opposite the differential carrier 42. For example, the shift mechanism housing 300 may be mounted to the cover exterior wall 102 of the differential carrier cover 66 with one or more fasteners 310, such as bolts. The shift mechanism housing 300 may cooperate with the differential carrier cover 66 to define the gear cavity 106. In addition, the shift mechanism housing 300 may facilitate mounting of the actuator 306 and may at least partially define a shift mechanism cavity 312 that may at least partially receive the shift collar 304. As is best shown in FIG. 2, the shift mechanism housing 300 may rotatably support the planet gear carrier 206 via the roller bearing assembly 238.

The end plate 302, which may also be referred to as an end cap, may be disposed on an end of the shift mechanism housing 300 that may be disposed opposite the axle housing 40. For example, the end plate 302 may be mounted to the shift mechanism housing 300 with a plurality of fasteners 320, such as bolts. The end plate 302 may rotatably support the shift collar 304. For example, the end plate 302 may have a support feature 322 that may be disposed on an interior surface of the end plate 302 and that may extend toward the differential carrier cover 66. The support feature 322 may be centered about the first axis 70 and may be substantially cylindrical in one or more configurations. The support feature 322 may be received in the shift collar 304 and may rotatably support the shift collar 304 such that the shift collar 304 may be rotatable about the support feature 322. The support feature 322 may be integrally formed with the end plate 302 or may be provided as a separate component.

Referring to FIG. 2, the shift collar 304 may be at least partially received in the shift mechanism housing 300. For instance, the shift collar 304 may be at least partially received in the shift mechanism housing 300 and may extend through components of the gear reduction module 26, such as the planet gear carrier 206. In at least one configuration such as is best shown in FIG. 14, the shift collar 304 may include a shift collar hole 330, a shift collar spline 332, a shift collar groove 334, and a shift collar gear 336.

The shift collar hole 330 may extend through the shift collar 304 and may extend around the first axis 70. The shift collar hole 330 may receive the shaft portion 122 of the drive pinion 22.

The shift collar spline 332 may be disposed in the shift collar hole 330 and may be axially positioned near a first end of the shift collar 304 that may face toward the differential carrier 42. The shift collar spline 332 may extend toward the first axis 70 and may mate with the spline 134 of the drive pinion 22. The mating splines may allow the shift collar 304 to move in an axial direction or along the first axis 70 while inhibiting rotation of the shift collar 304 about the first axis 70 with respect to the drive pinion 22. Thus, the shift collar 304 may be rotatable about the first axis 70 with the drive pinion 22.

The shift collar groove 334 may be disposed proximate a second end of the shift collar 304 that may face toward the end plate 302. The shift collar groove 334 face away from the first axis 70 and may extend around the first axis 70. The shift collar groove 334 may receive a linkage 340, such as a shift fork, that may operatively connect the shift collar 304 to the actuator 306.

The shift collar gear 336 may be disposed between the first end and the second end of the shift collar 304. The shift collar gear 336 may have teeth that may be arranged around the first axis 70 and that may extend away from the first axis 70.

The shift collar 304 may be movably disposed on the drive pinion 22 and the support feature 322. More specifically, the shift collar 304 may move axially or in a direction that extends along the first axis 70 between a first position, a second position, and a third position. These positions are illustrated in FIGS. 2-4.

Referring to FIG. 2, the shift collar 304 is shown in the first position. In the first position, the shift collar 304 may couple the planet gear carrier 206 to the drive pinion 22. For example, the teeth of the shift collar gear 336 may mesh with the teeth of the planet gear carrier gear portion 232 of the planet gear carrier 206. As such, torque that is provided by the electric motor module 24 may be transmitted through the adapter 250, sun gear 200, planet gears 202, and planet gear carrier 206 to the shift collar 304 and from shift collar 304 to the drive pinion 22. The shift collar 304 may be disposed in the shift mechanism housing 300 and in the differential carrier cover 66 and may not extend into the differential carrier 42 when in the first position or a low range gear ratio is selected.

Figure 3:
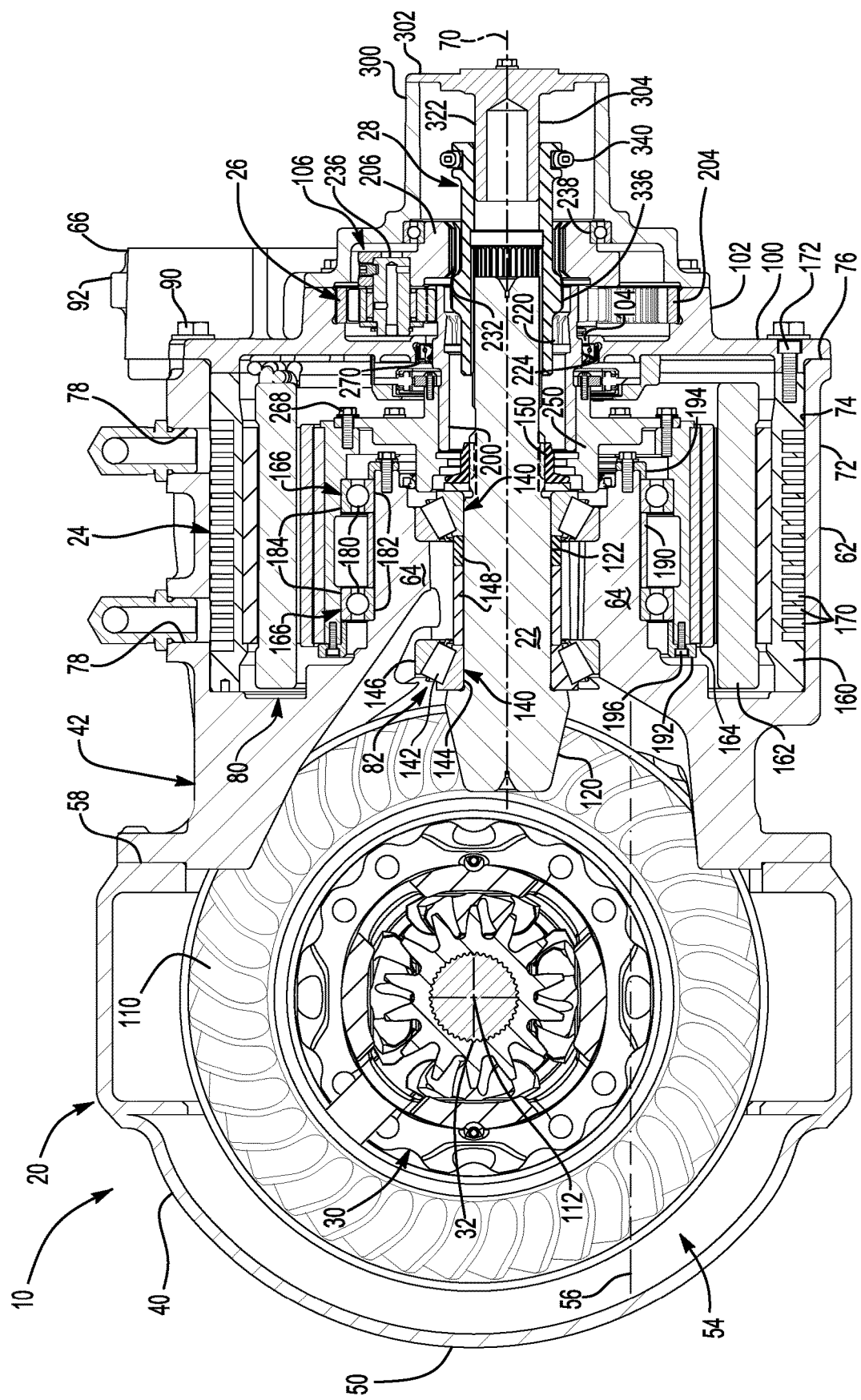
FIG. 3 is a section view of the axle assembly showing the shift collar in a second position.

Referring to FIG. 3, the shift collar 304 is shown in a second position or neutral position. The second position may be axially positioned between the first position and the third position. In the second position, the shift collar 304 may not couple the gear reduction module 26 to the drive pinion 22. For example, the teeth of the shift collar gear 336 may not mesh with the teeth of the sun gear 200 or the planet gear carrier 206. As such, torque that is provided by the electric motor module 24 may not be transmitted to the shift collar 304 or the drive pinion 22. The shift collar 304 may be disposed closer to the axle housing 40 when in the second position than when in the first position. The shift collar 304 may be axially positioned such that a portion of the shift collar 304 may extend through the differential carrier cover 66 and into the differential carrier 42 when the second position or neutral gear ratio is selected.

Figure 4:
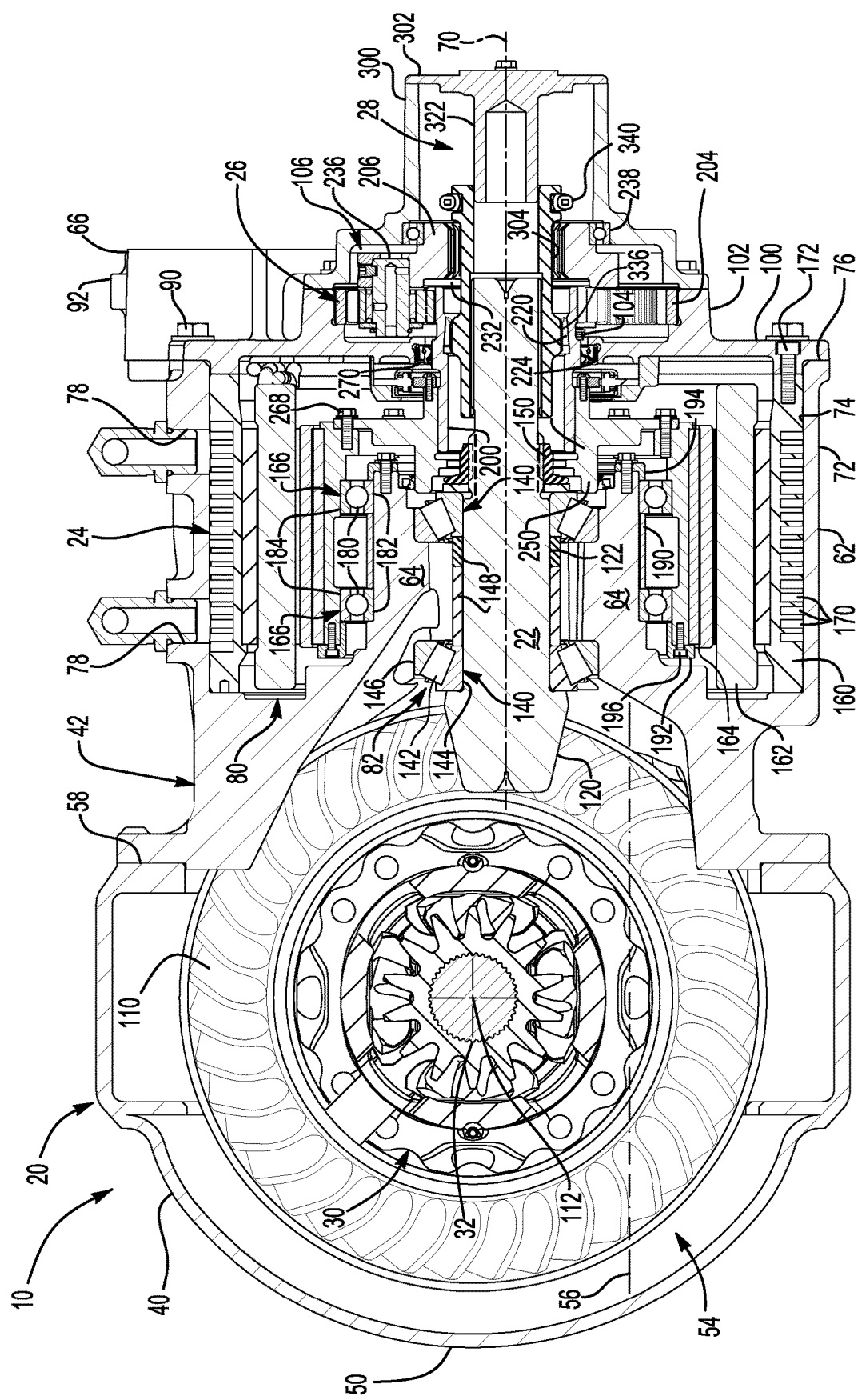
FIG. 4 is a section view of the axle assembly showing the shift collar in a third position.

Referring to FIG. 4, the shift collar 304 is shown in the third position. In the third position, the shift collar 304 may couple the sun gear 200 to the drive pinion 22. For example, the teeth of the shift collar gear 336 may mesh with the teeth of the second gear portion 222 of the sun gear 200. As such, torque that is provided by the electric motor module 24 may be transmitted through the adapter 250 and sun gear 200 to the shift collar 304 and from shift collar 304 to the drive pinion 22. The shift collar 304 may be disposed closer to the axle housing 40 when in the third position than when in the second position. The shift collar 304 may be axially positioned such that a portion of the shift collar 304 may extend through the differential carrier cover 66 and into the differential carrier 42 when the third position or high range gear ratio is selected.

It is also contemplated that the shift collar may be omitted such that the gear reduction module may provide a single gear ratio rather than multiple gear ratios. For example, the planet gear carrier 206 may be coupled to the drive pinion 22 to provide a low range gear ratio without a high range gear ratio.

Referring to FIGS. 1, 10, and 11, the actuator 306 may be disposed on the shift mechanism housing 300. The actuator 306 may move the shift collar 304 along the first axis 70 between the first, second, and third positions. For example, the actuator 306 may be coupled to the shift collar 304 with the linkage 340. The actuator 306 may be of any suitable type. For example, the actuator 306 may be an electrical, electromechanical, pneumatic or hydraulic actuator.

An electronic controller may control operation of the actuator 306 and hence movement of the shift collar 304. An example of shifting of the shift collar 304 will now be discussed in the context of an axle assembly 10 that has a gear reduction module 26 having a planetary gear configuration. Starting with the shift collar 304 in the first position, the electronic controller may receive one or more inputs that may be indicative of speed (e.g., rotational speed of the rotor 164) and/or torque (e.g., torque provided by the electric motor). Shifting of the shift collar 304 from the first position to the second position or neutral position may be commenced when the speed and/or torque exceed predetermined threshold levels. Torque on the shift collar 304 may be temporarily relieved or reduced by controlling the rotational speed of the electric motor so that the shift collar 304 may more easily be actuated from the first position to the second position. The shift collar 304 may then be actuated from the second position to the third position. More specifically, the rotational speed of the shift collar 304 may be synchronized with the rotational speed of the sun gear 200 and then the actuator 306 may be controlled to move the shift collar 304 from the second position to the third position. The steps may be generally reversed to move the shift collar 304 from the third position to the first position. For instance, torque on the shift collar 304 may be temporarily relieved or reduced to allow the shift collar 304 to move from the third position to the second position and rotational speed of the shift collar 304 and planet gear carrier 206 may be synchronized to allow the shift collar 304 to move from the second position to the first position.

Referring to FIG. 2, the flow of lubricant 56 in the axle assembly 10 will now be described in more detail. Lubricant 56 may flow between the axle housing 40 in the shift mechanism housing 300 without entering the outer cavity 80 due to the sealing provided by the adapter seal 270 and the sun gear seal 272. As such, lubricant 56 that is splashed by the ring gear 110 may flow through the hole 82 in the differential carrier 42 to reach the gear cavity 106 and the shift mechanism housing 300. For example, lubricant 56 may flow between the axle housing 40 and the gear cavity 106 by flowing through the hole 82, drive pinion bearings 140, the adapter hole 264 of the adapter 250, and the sun gear hole 214 of the sun gear 200. Lubricant 56 may then be directed to the planet gears 202 in the roller bearing assembly 238 that may rotatably support the planet gear carrier 206. Some lubricant 56 may also accumulate in the bottom of the gear cavity 106.

Referring to FIG. 2, the differential assembly 30 may be at least partially received in the center portion 50 of the housing assembly 20. The differential assembly 30 may transmit torque to the vehicle traction wheel assemblies and permit the traction wheel assemblies to rotate at different velocities. The differential assembly 30 may be operatively connected to the axle shafts 32 and may permit the axle shafts 32 to rotate at different rotational speeds in a manner known by those skilled in the art. As such, the differential assembly 30 may receive torque via the ring gear 110 and provide torque to the axle shafts 32.

Referring to FIGS. 1 and 2, the axle shafts 32 may transmit torque from the differential assembly 30 to corresponding traction wheel assemblies. For example, two axle shafts 32 may be provided such that each axle shaft 32 extends through a different arm portion 52 of axle housing 40. The axle shafts 32 may extend along and may be rotated about the second axis 112 by the differential assembly 30. Each axle shaft 32 may have a first end and a second end. The first end may be operatively connected to the differential assembly 30. The second end may be disposed opposite the first end and may be operatively connected to a wheel end assembly that may have a wheel hub that may support a wheel. Optionally, gear reduction may be provided between an axle shaft and a wheel.

Figure 18:
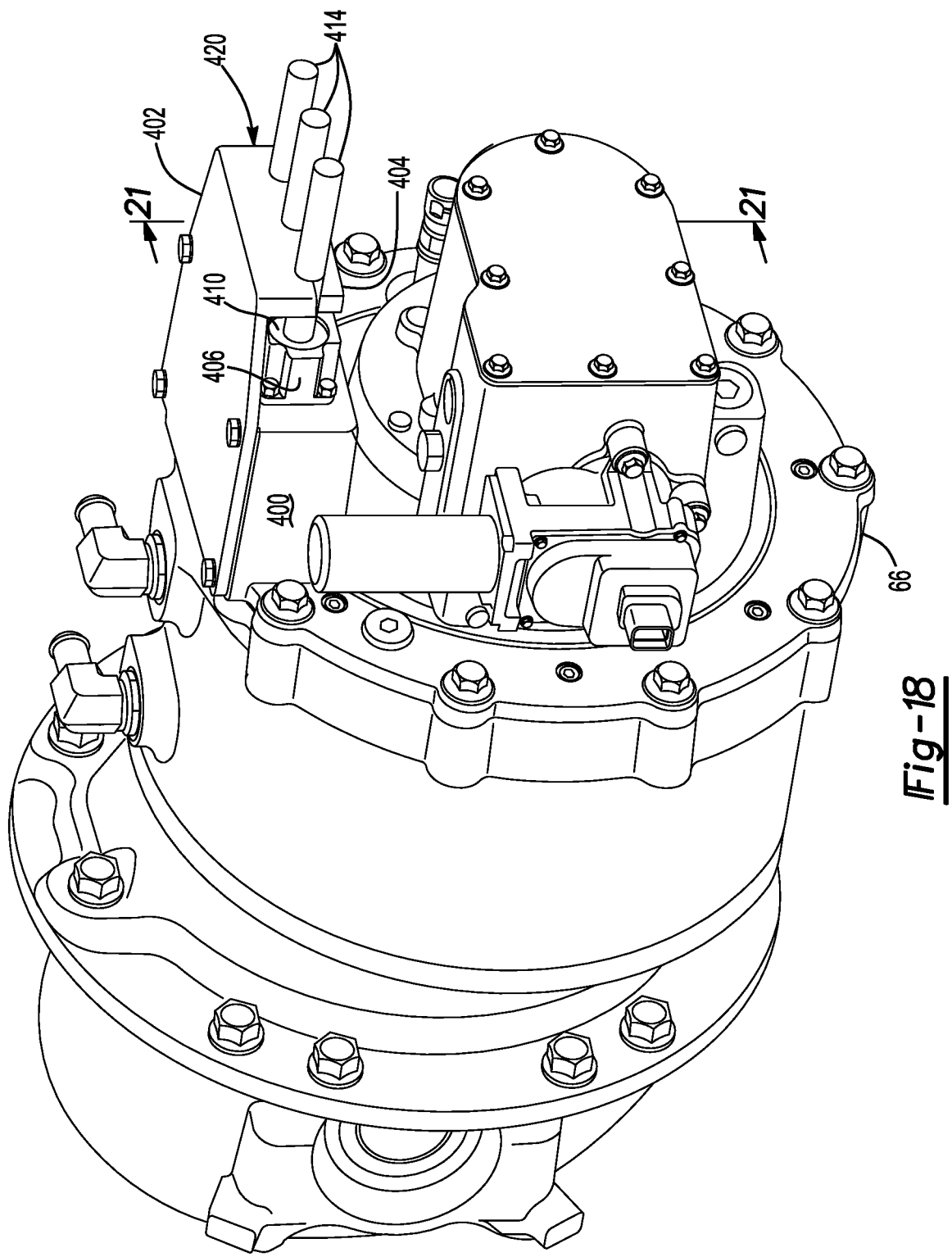
FIG. 18 is a perspective view of a portion of the axle assembly with another configuration of a shift mechanism housing.
Figure 21:
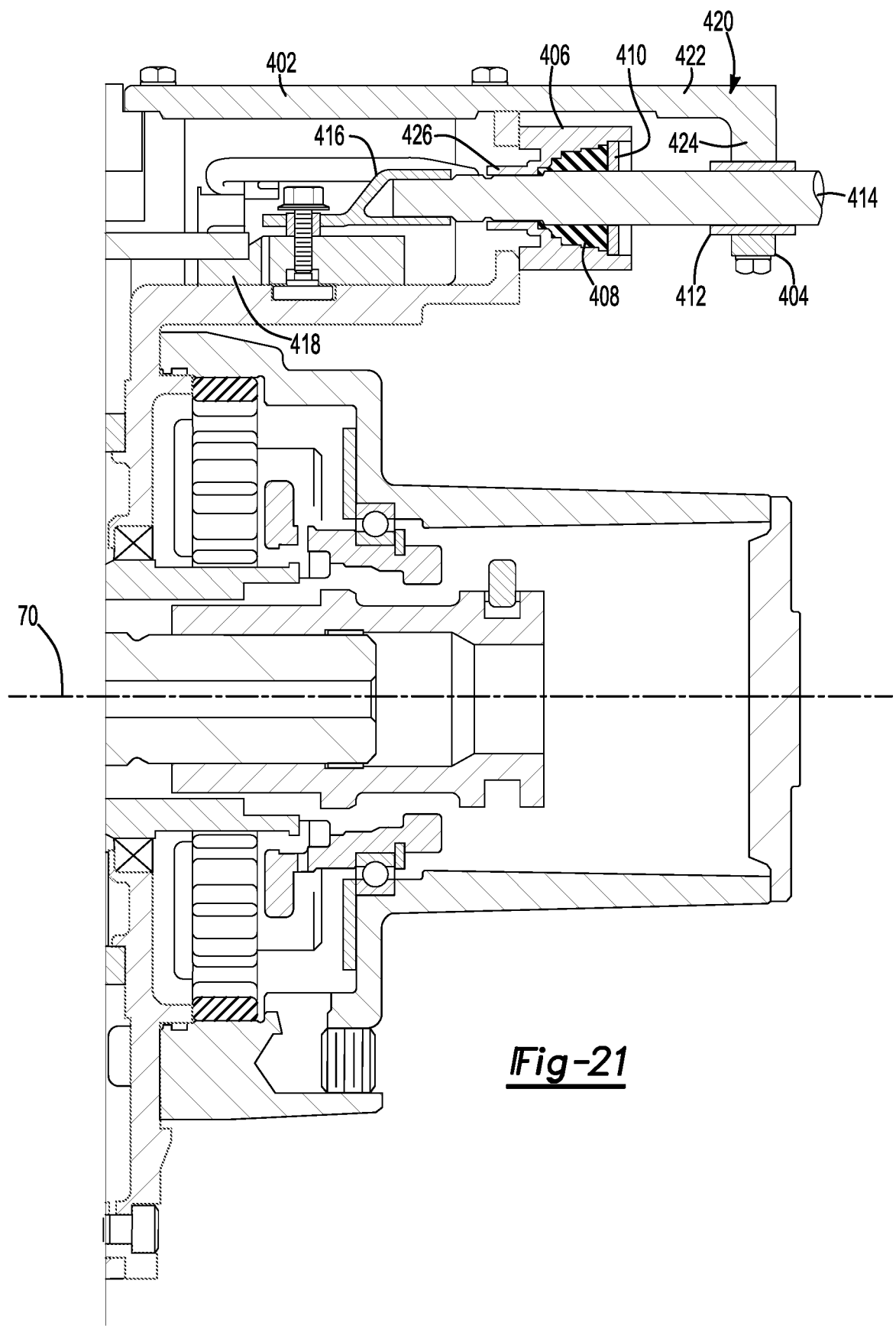
FIG. 21 is a section view of a portion of the shift mechanism housing along section line 21-21.

Referring to FIGS. 18 and 21, another configuration of an axle assembly is shown. In this configuration, a portion of the axle assembly, such as a cover like the differential carrier cover 66, may include or may support a terminal box 400, a terminal box cover 402, and a terminal box clamp 404. The terminal box 400 may also be associated with one or more phase blocks 406, one or more seals 408, one or more push nuts 410, and one or more optional sleeves 412.

Figure 19:
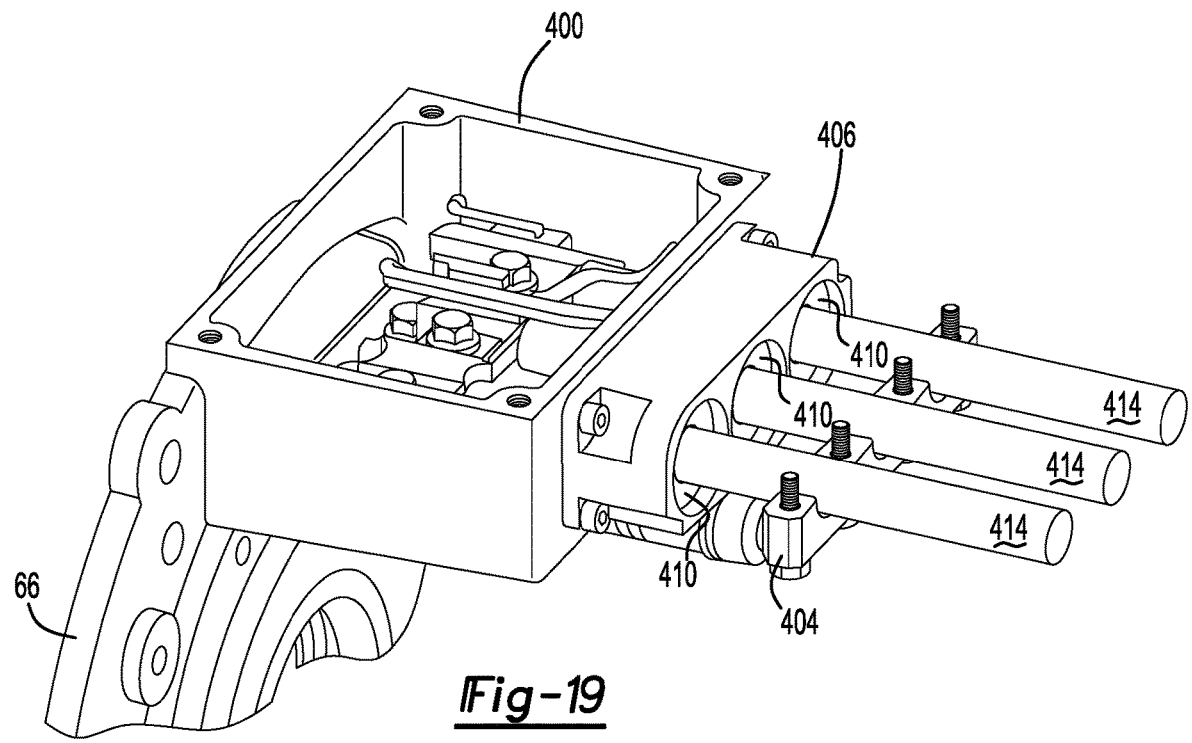
FIG. 19 is a perspective view of a portion of the shift mechanism housing of FIG. 18.

Referring to FIGS. 18, 19 and 21, the terminal box 400 may be disposed proximate the electric motor module 24 and may facilitate electrical connections to phase cables 414 that may conduct electrical energy to/from the electric motor module 24. Any suitable number of phase cables 414 may be provided. In the configuration shown, three phase cables 414 are provided that may conduct electrical energy from/to an electrical power source, such as a battery, generator, or the like. Each phase cable 414 may include a conductor that may be at least partially received in an insulator. As is best shown in FIG. 21, an end of the conductor of each phase cable 414 may be connected or crimped to a lug 416 that may be fastened to a terminal block 418, such as with a fastener like a screw. The terminal block 418 may be electrically connected to wires that may conduct electrical energy to/from the electric motor module 24. As such, the terminal box 400 may facilitate mounting the phase cables 414 and may electrically connect the phase cables 414 to the electric motor module 24.

Referring to FIGS. 18 and 21, the terminal box cover 402 may be mounted to the terminal box 400 and may help enclose the terminal box 400. The terminal box cover 402 may be a separate component from the terminal box 400 and may be removably fastened to the terminal box 400 in any suitable manner, such as with one or more fasteners like bolts or screws. At least a portion of the terminal box cover 402 may be disposed further from the first axis 70 than the electric motor module 24. The terminal box cover 402 may include a support bracket 420.

Figure 20:
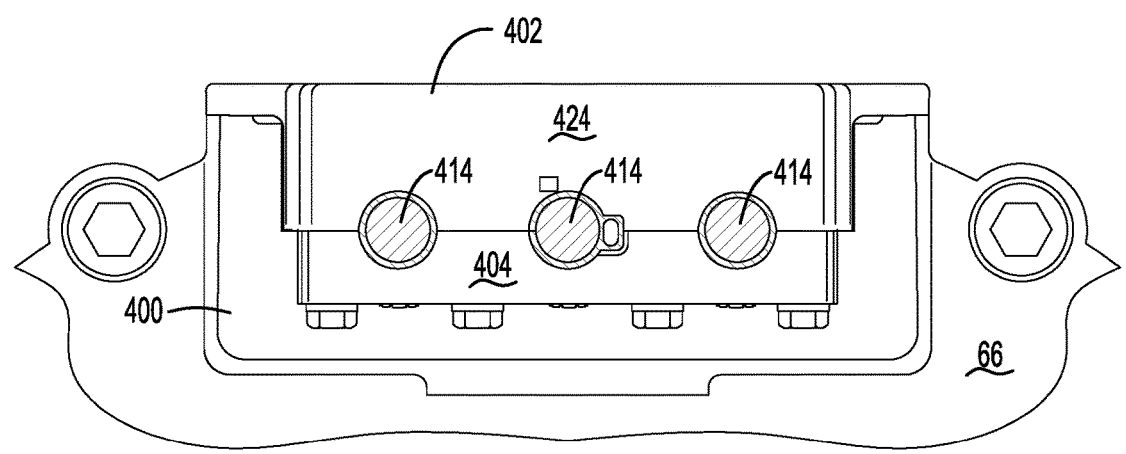
FIG. 20 is an end view of a portion of shift mechanism housing of FIG. 18.

Referring to FIGS. 18, 20, and 21, the support bracket 420 may be integrally formed with the terminal box cover 402 or may be a separate component that is mounted to the terminal box cover 402. As is best shown in FIG. 21, the support bracket 420 may be cantilevered from the terminal box 400 and may help support and inhibit bending of the phase cables 414. In at least one configuration, the support bracket 420 may have a generally L-shaped cross-section that may include a cantilever arm 422 and a support arm 424. The cantilever arm 422 may be cantilevered with respect to the terminal box 400 and may extend over the phase cables 414 and the phase block 406. Moreover, the cantilever arm 422 may be spaced apart from the phase cables 414 and the phase block 406. The support arm 424 may extend from an end of the cantilever arm 422 toward the phase cables 414. In at least one configuration, the support arm 424 may be disposed substantially perpendicular to the cantilever arm 422 and may be spaced apart from the phase block 406. As is best shown in FIG. 20, the support arm 424 may include a plurality of recesses. Each recess may receive a corresponding phase cable 414 and may have a configuration that is compatible with the shape of the phase cable 414. For instance, each recess may have a semicircular configuration and the recesses may be spaced apart from each other.

Referring to FIGS. 18-21, the terminal box clamp 404 may cooperate with the support bracket 420 to help secure and support the phase cables 414. The terminal box clamp 404 may be mounted and fastened to the support arm 424 of the support bracket 420. In at least one configuration, the terminal box clamp 404 may be fastened to an end of the support arm 424 and may be spaced apart from the terminal box 400. As is best shown in FIG. 20, the terminal box clamp 404 may include a plurality of recesses. Each recess may receive a corresponding phase cable 414 and may have a configuration that is compatible with the shape of the phase cable 414. For instance, each recess may have a semicircular configuration. The terminal box clamp 404 may be fastened to the support bracket 420 in any suitable manner, such as with one or more fasteners like bolts or screws. Accordingly, the terminal box clamp 404 may cooperate with the support bracket 420 to clamp against the insulator of the phase cables 414 to help secure the phase cables 414 to the terminal box cover 402. Securing the phase cables 414 to the terminal box cover 402 may inhibit or limit bending of the phase cables 414 between the terminal box clamp 404 and the terminal box 400, which in turn may help reduce stress or bending proximate the phase block 406 and terminal box 400.

Referring to FIGS. 19 and 21, one or more phase blocks 406 may be associated with the phase cables 414. For example, individual phase blocks 406 may be provided with each phase cable 414 or a phase block 406 may be associated with multiple phase cables 414. A phase block 406 that is associated with multiple phase cables 414 may include a plurality of openings through which corresponding phase cables 414 may extend. Individual phase blocks 406 may each have a single opening through which a corresponding phase cable 414 may extend. The phase block 406 may be mounted to the terminal box 400 and may be spaced apart from the terminal box cover 402, the support bracket 420, the terminal box clamp 404 or combinations thereof. Moreover, the phase block 406 may be mounted to a side of the terminal box 400 that faces toward the terminal box clamp 404 and may be positioned between the terminal box 400 and the terminal box clamp 404. As is best shown in FIG. 21, each opening may have a tapered configuration that may receive a seal 408 and a push nut 410. In addition, a phase block clamp 426 may extend from the narrow end of the taper and may be crimped onto the insulator of a phase cable 414 to secure the phase block 406 to the phase cable 414. The phase block clamp 426 may extend continuously around and may contact the phase cable 414 and may extend into the cavity of the terminal box 400 and one or more configurations.

Referring to FIG. 21, the seal 408 may be configured as a ring that may extend around a phase cable 414. The seal 408 may receive and may fit snugly against the insulator of a phase cable 414 to inhibit water ingression between the seal 408 and the phase cable 414. In addition, the seal 408 may fit snugly against the inner surface of the phase block 406 that defines the opening through which the phase cable 414 extends to inhibit water ingression between the seal 408 and the phase block 406.

The push nut 410 may help secure the seal 408 in the phase block 406. The push nut 410 make be configured as a ring that may extend at least partially around the phase cable 414. The push nut 410 may be positioned against an end of the seal 408 that may face toward the terminal box clamp 404 and may be received in an opening of the phase block 406 with an interference fit. Accordingly, the push nut 410 may inhibit the seal 408 from moving away from the terminal box 400 and toward the terminal box clamp 404. Moreover, the phase block 406, seal 408, push nut 410, or combinations thereof may help inhibit bending of a phase cable 414 that may lead to water ingression, cable damage, or loosening of the phase cable 414, thereby helping provide a more robust and supported connection.

Optionally, each phase cable 414 may extend through a sleeve 412. The sleeve 412 may be generally cylindrical and may extend around the phase cable 414. The sleeve 412 may be received between the support bracket 420 and the terminal box clamp 404 and may contact the support bracket 420 and the terminal box clamp 404. The sleeve 412 may be made of an elastic material and/or a stiffer material than the phase cable 414 or its insulator. As such, the sleeve 412 may help further protect a phase cable 414 and may help further inhibit bending of a phase cable 414 to help reduce stress or potential disengagement of a phase cable 414, damage to a phase cable 414, or bending or kinking of a phase cable 414 that may result in damage to the phase cable 414 or its insulator or reduce the sealing effectiveness of the seal 408. The phase cable 414 having elastic properties may provide a limited amount of compression and strain relief to help reduce stress or potential disengagement of a phase cable 414 or potential damage. The phase cable 414 may be substantially linear between the terminal box 400 and the terminal box clamp 404.

Referring to FIG. 22, additional refinements to the axle assembly will now be described.

In FIG. 22, the bearing support wall 430 may be provided as a separate component that may be fastened to the differential carrier 42 similar to the configuration shown in FIG. 15. The bearing support wall 430 may be made of a different material than the differential carrier 42. For instance, differential carrier 42 may be made of a first material while the bearing support wall 430 may be made of a second material that has a greater stiffness or is a stiffer material than the first material. As an example, the differential carrier 42 may be made of a non-ferrous material, such as aluminum, while the bearing support wall 430 may be made of a ferrous material, such as cast iron or steel. In such configurations, the differential carrier 42 may be made of a lighter weight material than the bearing support wall 430 while the bearing support wall 430 may be made of a material that may be less expensive as compared to the material of the differential carrier 42 and may have stiffness and thermal expansion characteristics that are more similar to the stiffness and thermal expansion characteristics of the drive pinion bearings 140, the rotor bearings 166, or both. For instance, a drive pinion bearing 140 may have a drive pinion bearing coefficient of thermal expansion that may have a value or magnitude that is closer to a second coefficient of thermal expansion of the second material from which the bearing support wall 430 is made than a first coefficient of thermal expansion of the first material from which the differential carrier 42 is made. Similarly, a rotor bearing 166 may have a rotor bearing coefficient of thermal expansion that may have a value or magnitude that is closer to the second coefficient of thermal expansion than the first coefficient of thermal expansion. As such, the bearing support wall 430 may expand and contract in a similar manner as the drive pinion bearings 140, the rotor bearings 166, or both, which may help maintain desired positioning and alignment of these components, help keep bearing preload force is within acceptable limits, or combinations thereof.

Providing a bearing support wall 430 that is a separate component may also allow the differential carrier 42 to be standardized and allow different bearing support walls to be provided to accommodate different gear ratios. For instance, bearing support walls 430 may be provided in different configurations so that drive pinions 22 may be provided in different axial positions to accommodate different gear ratios or different gear tooth profiles instead of providing different differential carrier configurations to accommodate different gear ratios, which may help reduce manufacturing costs and complexity. As an example, multiple differential carriers 42 may be provided that have the same configuration. First and second differential assemblies may be provided that may have first and second ring gears, respectively, that may have different configurations. For instance, the first ring gear may have a larger diameter than the second ring gear or may have teeth that have a gear tooth profile that differs from a gear tooth profile of the second ring gear. Similarly, first and second bearing support walls may be provided that have different configurations. The first differential assembly and the first bearing support wall may be attached to a differential carrier to help make a first axle assembly while the second differential assembly and the second bearing support wall may be attached to the second differential carrier to help provide a second axle assembly. In addition, first and second drive pinions may be mounted in the first and second bearing support walls, respectively. The first and second drive pinions may have different configurations, may be disposed in different axial positions, may have different axial lengths, may have different gear tooth profiles, or combinations thereof. As such, the first drive pinion and the first ring gear may be configured to provide a first gear ratio while the second drive pinion and the second ring gear may be configured to provide a second gear ratio the differs from the first gear ratio.

FIG. 22 also depicts an alternative lubricant flow arrangement. The bearing support wall 430 may include various passages that may help route lubricant 56 to various components and may help better circulate lubricant 56 in the axle assembly. For instance, the bearing support wall 430 may include and may define a first lubricant passage 440 and a second lubricant passage 442. The first lubricant passage 440 is represented with a dotted line while the second lubricant passage 442 is represented with a dashed line. The first lubricant passage 440 and the second lubricant passage 442 may be spaced apart from each other and may be located above the first axis 70 and/or above the drive pinion 22. Lubricant 56 that is splashed by the ring gear 110 may pass through an opening 444 in the differential carrier 42 to reach the first lubricant passage 440 and/or the second lubricant passage 442; however, it is contemplated that the first lubricant passage 440 and the second lubricant passage 442 may extend from different openings. Regardless of the opening arrangement, the first lubricant passage 440 and the second lubricant passage 442 may receive lubricant 56 that is splashed by the ring gear 110 when it rotates.

The first lubricant passage 440 may provide lubricant 56 to the drive pinion bearings 140. For example, the first lubricant passage 440 may provide lubricant 56 to a gallery 446 that may be axially positioned between the drive pinion bearings 140. This lubricant 56 may be pumped through the drive pinion bearings 140 when the drive pinion 22 rotates about the first axis 70 as represented by the solid arrows located below the drive pinion 22 that are depicted as extending through the drive pinion bearings 140. Lubricant 56 that is pumped through the drive pinion bearing 140 that is located closest to the ring gear 110 may return to the sump portion 54 while lubricant 56 may be pumped through the other drive pinion bearing 140 away from the ring gear 110 toward components that are remotely located from the ring gear 110.

The second lubricant passage 442 may help provide lubricant 56 to the gear reduction module 26 and the shift mechanism 28. For example, the second lubricant passage 442 may be longer than the first lubricant passage 440 and may route lubricant 56 past the drive pinion bearings 140. As such the outlet of the second lubricant passage 442 may be disposed further from the differential assembly 30 than the drive pinion bearings 140 as well as the first lubricant passage 440 and its outlet. The second lubricant passage 442 may provide lubricant 56 to a gallery that is located outside of the drive pinion 22 and inside the sun gear 200. This lubricant 56 may exit the second lubricant passage 442 and may pass through the adapter 250 and flow away from the ring gear 110 toward and around the shift collar 304. The sun gear 200, planet gear carrier 206, or both, may be provided with one or more through holes that may extend radially with respect to the first axis 70 and may help distribute lubricant 56 to the gears and bearings associated with the gear reduction module 26. The lubricant 56 may then be distributed by centrifugal forces to components of the planetary gear set as the drive pinion 22 rotates and may also flow into the shift mechanism housing 300 to help lubricate internal components, such as the actuator for the shift collar 304. Moreover, lubricant 56 may at least partially fill the shift mechanism housing 300. Lubricant 56 in the shift mechanism housing 300 may be disposed above lubricant 56 in the sump portion 54, which may facilitate the flow of lubricant 56 from the shift mechanism housing 300 to the sump portion 54 by gravity.

The long horizontal solid arrows extending toward the ring gear 110 or toward the left from the perspective shown represent the flow of lubricant back to the sump portion 54. For instance, the drive pinion 22 may be provided with a drive pinion passage 448 that may be a through hole that may extend completely through the drive pinion 22. As such, the drive pinion passage 448 may extend through the gear portion 120 and the shaft portion 122. The drive pinion passage 448 may extend along the first axis 70. Lubricant 56 in the shift mechanism housing 300 may flow back to the sump portion 54 through the drive pinion passage 448 when the level of lubricant 56 in the shift mechanism housing 300 is sufficiently high or high enough that lubricant 56 may enter the drive pinion passage 448. Moreover, lubricant 56 in the shift mechanism housing 300 may flow through the shift collar hole 330 of the shift collar 304 and enter the shift collar 304 before entering the drive pinion passage 448. For example, lubricant 56 that collects at the bottom of the differential carrier cover 66 may flow to the shift mechanism housing 300 before returning to the sump portion 54 as indicated by the short horizontal arrowed line that points to the right in FIG. 22. This lubricant 56 may also pass through the roller bearing assembly 238 that rotatably supports the planet gear carrier 206.

Lubricant 56 may also flow back to the sump portion 54 when the drive pinion 22 is or is not rotating and the level of lubricant in the shift mechanism housing 300 is below the drive pinion passage 448 as represented by the second-longest solid arrowed line. For instance, lubricant 56 may flow around the shift collar 304 and between the shift collar 304 and the sun gear 200, around the preload nut 150, and through the drive pinion bearings 140 when the level of lubricant 56 in the shift mechanism housing 300 is higher than the level of lubricant 56 in the sump portion 54. Some lubricant 56 may collect in the bottom of the shift mechanism housing 300 proximate the planetary ring gear 204 and planet gears 202, but an appreciable amount of lubricant 56 may drain from the shift mechanism housing 300 back to the sump portion 54, which may help circulate the lubricant 56 so that lubricant 56 throughout the axle assembly may have substantially the same oil oxidation level, which may help improve lubricant life or prevent a portion of the axle assembly from having lubricant with an appreciably different oxidation level and an associated discrepancy in lubricant performance and effectiveness. In addition, the configuration described above may allow lubricant to flow internally between the sump portion 54 and the shift mechanism housing 300 without an external conduit or hose that may be located outside of the housing assembly 20. As a result, lubricant 56 may be kept inside the housing assembly 20 and may not be routed through an external conduit or hose that may impair or reduce lubricant flow and circulation in cold ambient temperatures as compared to not routing lubricant outside of the housing assembly 20.

Figure 23:
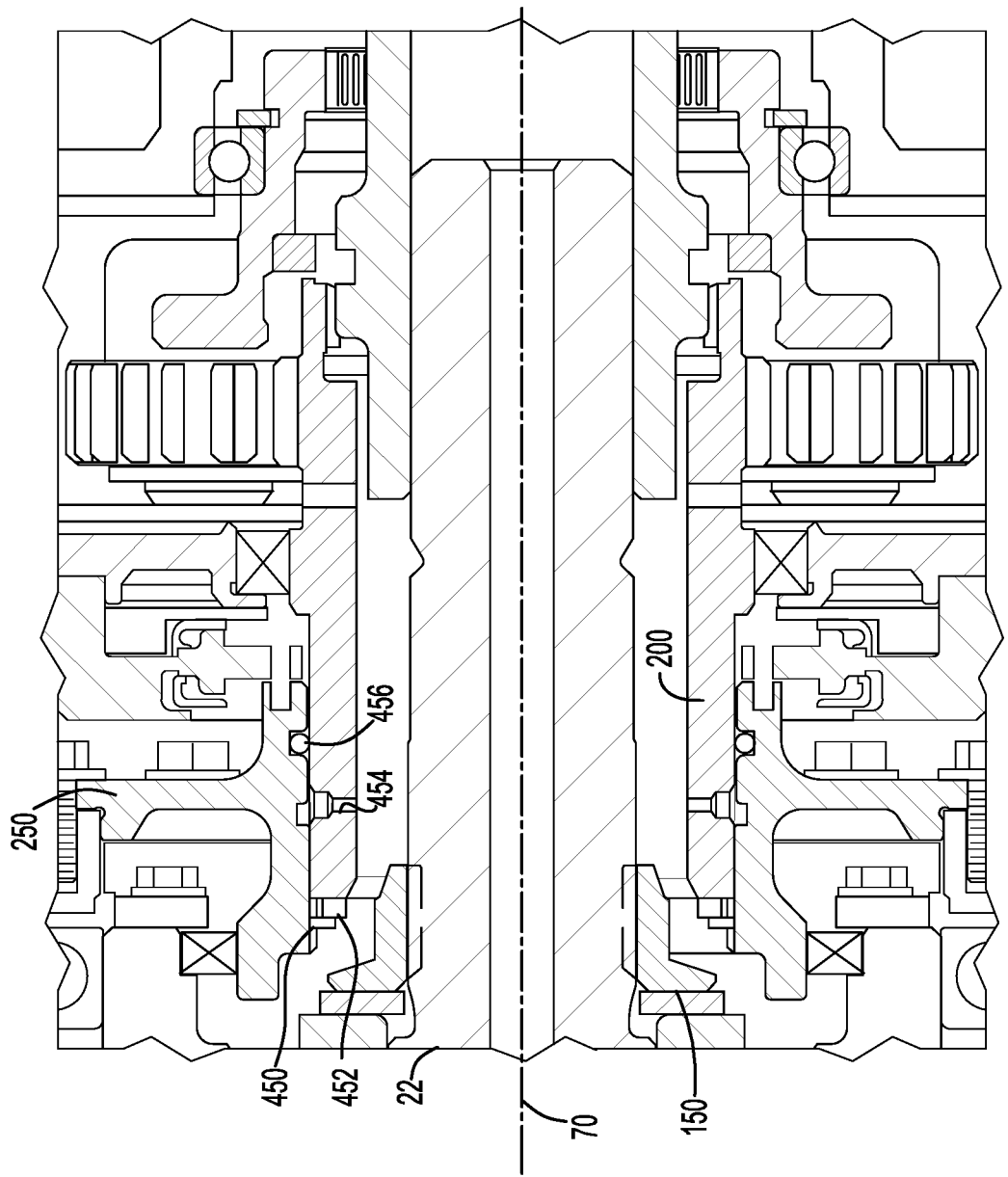
FIG. 23 is a section view of the axle assembly showing an example of a seal that may be associated with a sun gear of the gear reduction module.

Referring to FIG. 23, a magnified section view is shown that shows further attributes that may be associated with the sun gear 200. Starting at the left end of the sun gear 200 from the perspective shown, a retainer 450 and a shim 452 may be disposed at an end of the sun gear 200. The retainer 450 may be coupled to the adapter 250 and may have any suitable configuration. For instance, the retainer 450 may be a snap ring or the like. The shim 452 may extend from the retainer 450 to the end of the sun gear 200. The retainer 450 and the shim 452 may cooperate to inhibit axial movement of the sun gear 200 toward the preload nut 150 or to the left from the perspective shown.

The vent hole 454 may be a through hole that may facilitate lubrication of the sun gear spline 218 by allowing lubricant 56 to pass through the vent hole 454. The flow of lubricant 56 may be further aided by centrifugal forces when the drive pinion 22 and sun gear 200 rotate. The vent hole 454 may also help provide vacuum reduction.

A sun gear seal 456, such as an O-ring, may extend continuously around the sun gear 200 and may extend from the sun gear 200 to the adapter 250. The sun gear seal 456 may help isolate the lubricant 56 from components of the electric motor module 24, such as the stator 162, rotor 164, and rotary encoder 280.

Figure 24:
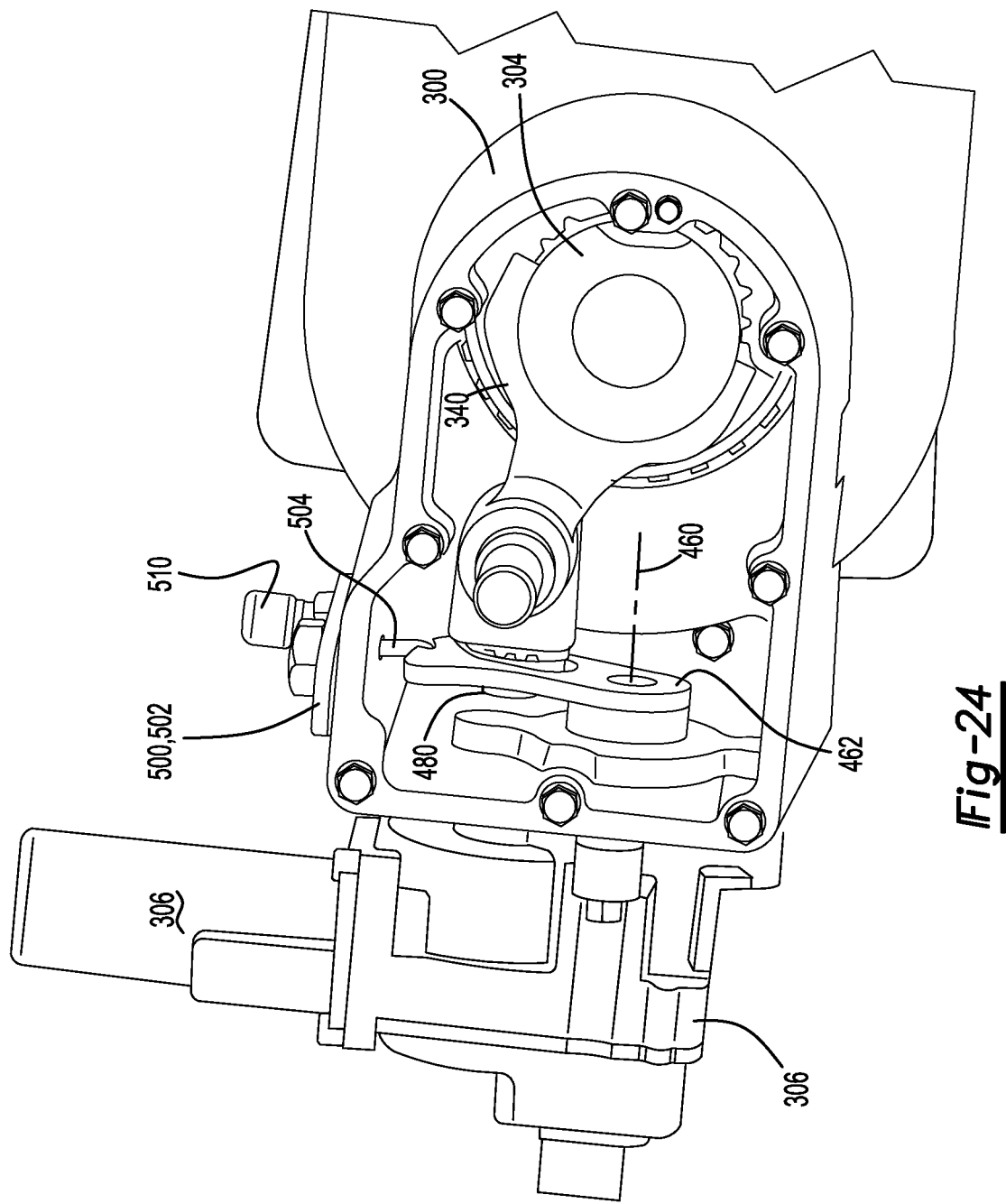
FIG. 24 is a perspective view of another example of a shift mechanism housing and associated actuator arrangement.

Referring to FIG. 24, an alternative configuration for the shift mechanism housing 300 is shown with another actuator arrangement. The actuator arrangement may include an actuator 306 as previously described that may rotate an actuator shaft about an actuator shaft axis 460.

Referring to FIGS. 24 and 25, a sector cam 462 may be fixedly mounted to the actuator shaft. As such, the sector cam 462 may be rotatable about the actuator shaft axis 460 with the actuator shaft. The sector cam 462 may be coupled to the actuator shaft in any suitable manner. For example, the sector cam 462 may include a hole that may receive the actuator shaft. The actuator shaft may be press fit into the hole or may be secured to the sector cam 462 in any suitable manner, such as with one or more fasteners, a weld, adhesive, or other bonding technique. The sector cam 462 may resemble a sector of a circle and may have an arcuate exterior surface. The sector cam 462 may include a cam window 470 and a set of notches 472.

The cam window 470 may be disposed within the sector cam 462. For example, the cam window 470 may be configured as a through hole that may be completely defined within the sector cam 462. The cam window 470 may receive a roller 480 that may be provided with the linkage 340. The cam window 470 may be generally disposed near the middle of the sector cam 462 and may be generally disposed between the actuator shaft axis 460 and the set of notches 472.

The cam window 470 may be at least partially defined by a cam surface that may guide movement of the linkage 340 when the sector cam 462 is rotated. More specifically, the cam surface may engage the roller 480 and guide movement between multiple points when the sector cam 462 is rotated as will be discussed in more detail below. Also, the linkage 340 may slide along a shaft or shift rail when the sector cam 462 is rotated.

The set of notches 472 may be arranged along an exterior surface of the sector cam 462, such as along the arcuate exterior surface. The members of the set of notches 472 may be spaced apart from each other and may be configured as indentations that may be generally concave. As is best shown in FIG. 25, three notches 472 may be provided. Each member of the set of notches 472 may correspond with a different shift collar position.

A detent mechanism 500 may be provided to help control movement of the sector cam 462. In at least one embodiment, the detent mechanism 500 may be mounted to the shift mechanism housing 300 and may include a detent actuator 502 and a detent feature 504.

The detent actuator 502 may be configured to move the detent feature 504 between a retracted position and an extended position. In the retracted position, the detent feature 504 may be spaced apart from the sector cam 462. In the extended position, the detent feature 504 may engage the sector cam 462 and may be received in a member of the set of notches 472 depending on the rotational position of the sector cam 462. The detent actuator 502 may exert sufficient force to inhibit rotation of the sector cam 462 when the detent feature 504 is received in a notch 472. The detent actuator 502 may be of any suitable type, such as a pneumatic, hydraulic, mechanical, electrical, or electromechanical actuator. In at least one embodiment, the detent actuator 502 may be configured as a solenoid in which the detent feature 504 may be actuated toward the retracted position when power is not provided to the solenoid and may be actuated toward the extended position when power is provided to energize coils of the solenoid. Alternatively, it is contemplated that the detent actuator 502 may be actuated toward the retracted position when power is provided in one or more embodiments. The sector cam 462 may be free to rotate when the detent feature 504 is in the retracted position. Optionally, a biasing member, such as a spring, may be provided that may bias the sector cam 462 to rotate in a clockwise or a counterclockwise direction when the detent feature 504 is in the retracted position.

The detent feature 504 may be coupled to the detent actuator 502. The detent feature 504 may be configured to be received in a notch 472 to inhibit rotation of the sector cam 462 and may slide along an arcuate exterior surface of the sector cam 462 between the notches 472 when the sector cam 462 is rotated and a notch 472 is not aligned with the detent feature 504.

Referring to FIGS. 25 and 26, the actuator arrangement and the shift collar 304 are shown in the first position. In the first position, the shift collar 304 may couple the planet gear carrier 206 to the drive pinion 22 as previously discussed. The roller 480 may be located at a first point along the cam surface. The detent feature 504 may be received in the first notch 472, designated with the letter A.

Figure 28:
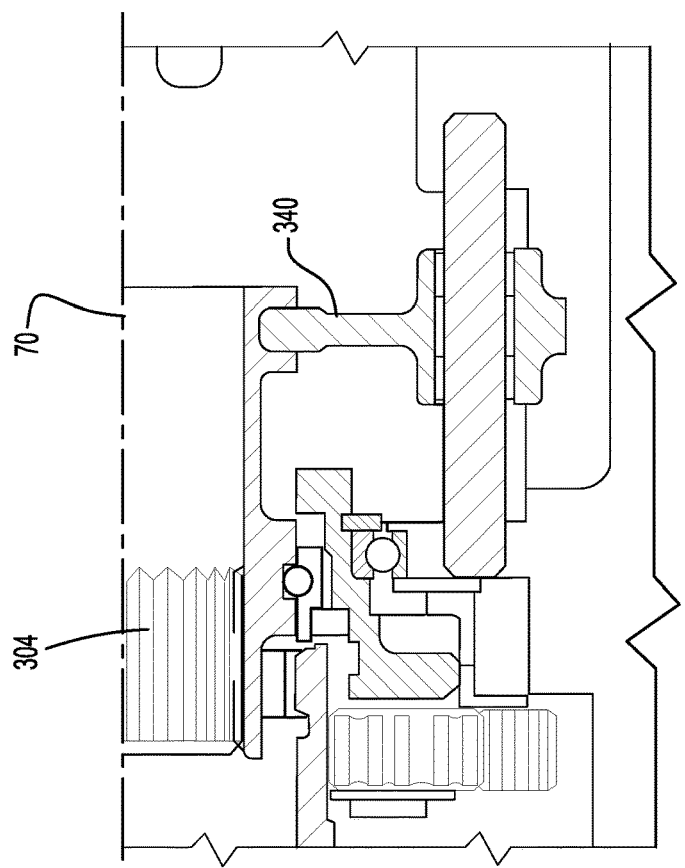
FIG. 28 is a section view of a portion of the axle assembly showing the shift collar in the second position.
Figure 27:
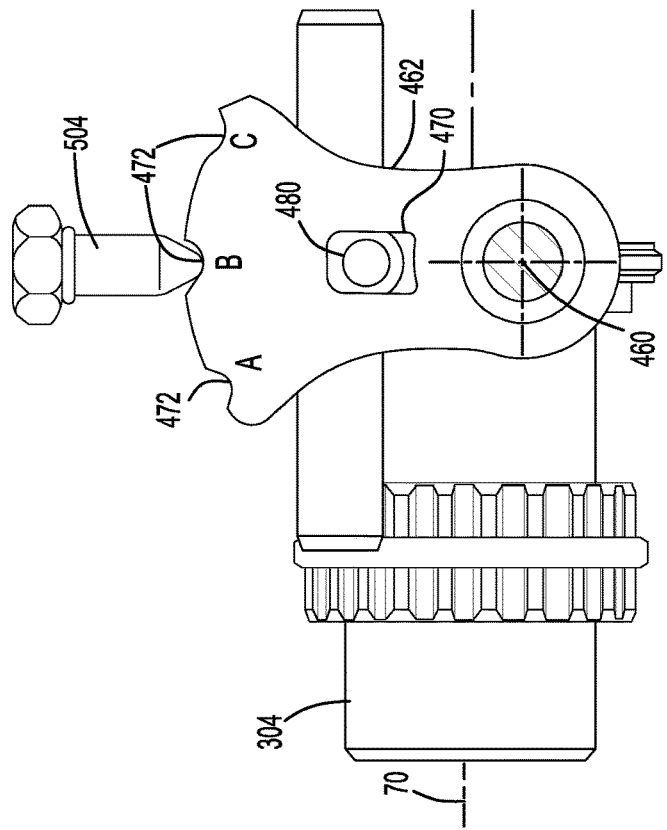
FIG. 27 is a side view of the actuator arrangement in a second position.

Referring to FIGS. 27 and 28, the actuator arrangement and the shift collar 304 are shown in the second position or a neutral position. In the second position, the shift collar 304 may be axially positioned between the first position and the third position as previously discussed. The shift collar 304 may move from the first position to the second position in response to force exerted by the actuator via the roller 480 and linkage 340. The roller 480 may be located at a second point along the cam surface that may differ from the first point. The detent feature 504 may be received in the second notch 472, designated with the letter B.

Figure 30:
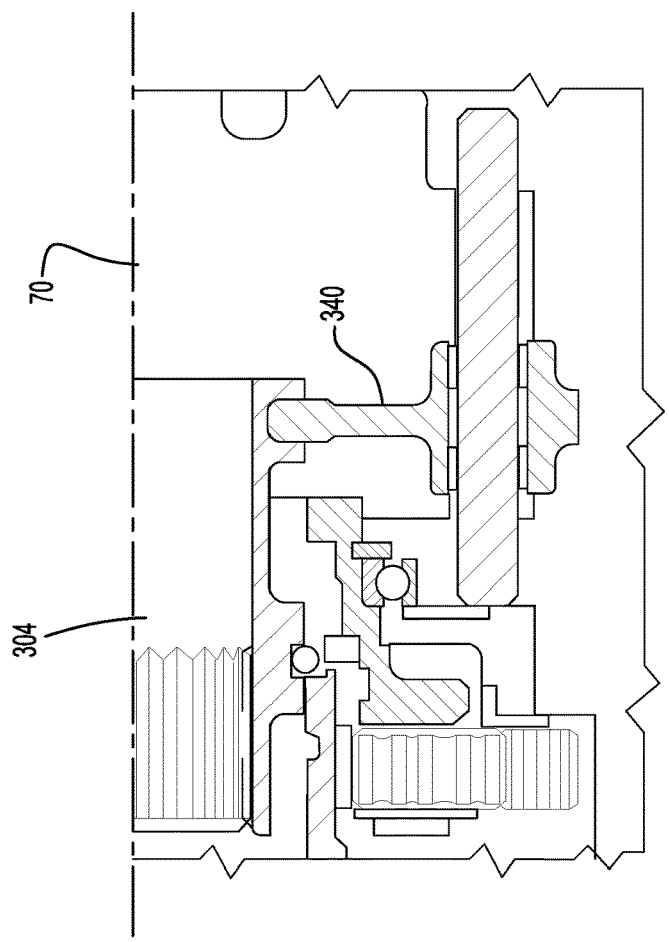
FIG. 30 is a section view of a portion of the axle assembly showing the shift collar in the third position.
Figure 29:
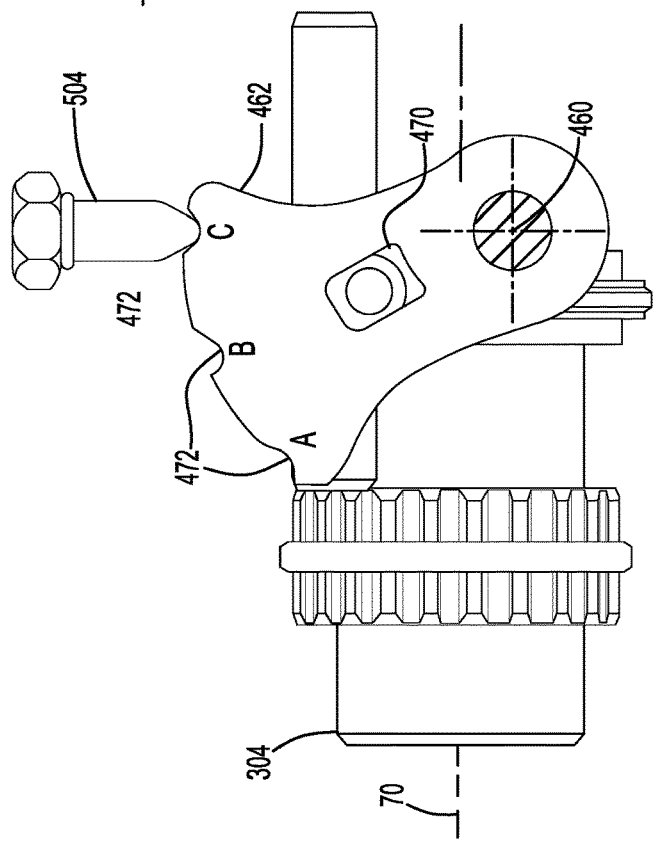
FIG. 29 is a side view of the actuator arrangement in a third position.

Referring to FIGS. 29 and 30, the actuator arrangement and the shift collar 304 are shown in the third position. In the third position, the shift collar 304 may couple the sun gear 200 to the drive pinion 22. The shift collar 304 may move from the second position to the third position in response to force exerted by the actuator via the roller 480 and linkage 340. The roller 480 may be located at a third point along the cam surface that may differ from the first point and the second point. The detent feature 504 may be received in the third notch 472, designated with the letter C.

The actuator arrangement described above may provide a more compact design than other configurations, such as a configuration having a rack and pinion.

Referring again to FIG. 24, the shift mechanism housing 300 may include a vent 510. The vent 510 may help equalize pressure between the inside of the housing assembly 20 and the surrounding environment. For example, the vent 510 may help avoid pressure buildup within the housing assembly 20 which may potentially lead to seal leaks.

The axle assembly described above may allow an electric motor module to be assembled to or retrofitted on an existing axle housing. In addition, a gear reduction module or gear reduction module accompanied by a shift mechanism may optionally be provided to provide gear reduction that may improve vehicle traction at low speeds or on increased road grades. The modular end-to-end positioning of the gear reduction module and the shift mechanism may allow gear reduction modules and shift mechanisms to be added to or removed from an axle assembly to meet operating conditions or performance requirements. Moreover, the modular construction may allow components such as the differential carrier, differential carrier cover, and shift mechanism housing to be made of a lighter weight material, such as aluminum, as compared to the axle housing, which may help reduce weight and improve fuel economy. The removable end plate may also allow the axle assembly to be coupled to a drive shaft which may allow the axle assembly to be provided as part of a parallel hybrid driveline rather than an all-electric configuration.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an axle housing;
   a differential carrier that is mounted to the axle housing and is made of a first material; and
   a bearing support wall that is mounted to the differential carrier, wherein the bearing support wall receives and rotatably supports a drive pinion, is received inside and rotatably supports a rotor of an electric motor module, and is made of a second material that has a greater stiffness than the first material, wherein the bearing support wall is received inside a rotor bearing that rotatably supports the rotor, the rotor bearing has a rotor bearing coefficient of thermal expansion, the first material has a first coefficient of thermal expansion, the second material has a second coefficient of thermal expansion, and the rotor bearing coefficient of thermal expansion is closer to the second coefficient of thermal expansion than the first coefficient of thermal expansion.

2. The axle assembly of claim 1 wherein the first material is a non-ferrous material and the second material is a ferrous material.

3. The axle assembly of claim 2 wherein the first material is aluminum and the second material is cast iron.

4. The axle assembly of claim 2 wherein the first material is aluminum and the second material is steel.

5. The axle assembly of claim 1 wherein the bearing support wall defines a hole that receives a drive pinion bearing that extends from the bearing support wall and rotatably supports the drive pinion, wherein the drive pinion bearing has a drive pinion bearing coefficient of thermal expansion, and the drive pinion bearing coefficient of thermal expansion is closer to the second coefficient of thermal expansion than the first coefficient of thermal expansion.

6. The axle assembly of claim 1 wherein the bearing support wall defines a hole that receives a drive pinion bearing that extends from the bearing support wall and rotatably supports the drive pinion, wherein the drive pinion bearing has a drive pinion bearing coefficient of thermal expansion that is closer to the second coefficient of thermal expansion than the first coefficient of thermal expansion.

7. The axle assembly of claim 1 wherein the drive pinion is rotatable about a first axis and has a gear portion and a shaft portion that extends from the gear portion, wherein a first drive pinion bearing and a second drive pinion bearing extend from the shaft portion to the bearing support wall and the first drive pinion bearing is disposed further from the first axis than the second drive pinion bearing.

8. The axle assembly of claim 7 wherein the first drive pinion bearing engages the gear portion.

9. A method of making a first axle assembly and a second axle assembly comprising:
   providing a first differential carrier and a second differential carrier that have the same configuration;
   providing a first differential assembly having a first ring gear;
   providing a second differential assembly having a second ring gear that has a different configuration than the first ring gear;
   providing a first bearing support wall and a second bearing support wall, wherein the second bearing support wall has a different configuration than the first bearing support wall;
   attaching the first differential assembly and the first bearing support wall to the first differential carrier to provide the first axle assembly; and
   attaching the second differential assembly and the second bearing support wall to the second differential carrier to provide the second axle assembly.

10. The method of claim 9 wherein the first ring gear has a larger diameter than the second ring gear.

11. The method of claim 9 wherein the first ring gear has a first set of teeth that has a first gear tooth profile and the second ring gear has a second set of teeth that has a second gear tooth profile, wherein the first gear tooth profile differs from the second gear tooth profile.

12. The method of claim 9 further comprising providing a first drive pinion and mounting the first drive pinion inside a first hole that is defined by the first bearing support wall.

13. The method of claim 12 further comprising providing a second drive pinion and mounting the second drive pinion inside a second hole that is defined by the second bearing support wall.

14. The method of claim 13 wherein the first drive pinion has a different configuration than the second drive pinion.

15. The method of claim 13 wherein the first drive pinion and the second drive pinion are disposed in different axial positions.

16. The method of claim 15 wherein the first drive pinion and the second drive pinion have different axial lengths.

17. The method of claim 15 wherein the first drive pinion and the first ring gear are configured to provide a first gear ratio.

18. The method of claim 17 wherein the second drive pinion and the second ring gear are configurated to provide a second gear ratio that differs from the first gear ratio.

19. The method of claim 15 wherein the first drive pinion has a first plurality of teeth that has a first tooth profile and the second drive pinion has a second plurality of teeth that has a second tooth profile, wherein the first tooth profile differs from the second tooth profile.

* * * * *